(12) United States Patent
Pan

(10) Patent No.: US 11,899,351 B2
(45) Date of Patent: Feb. 13, 2024

(54) ILLUMINATION SYSTEM AND PROJECTION DEVICE

(71) Applicant: Coretronic Corporation, Hsin-Chu (TW)

(72) Inventor: Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/560,261

(22) Filed: Dec. 23, 2021

(65) Prior Publication Data

US 2022/0206375 A1    Jun. 30, 2022

(30) Foreign Application Priority Data

Dec. 29, 2020    (CN) .......................... 202011586804.6

(51) Int. Cl.
  *G03B 21/20*    (2006.01)
  *G02B 27/10*    (2006.01)
  *G02B 26/00*    (2006.01)

(52) U.S. Cl.
  CPC ......... *G03B 21/204* (2013.01); *G02B 26/008* (2013.01); *G02B 27/1046* (2013.01); *G03B 21/2013* (2013.01); *G03B 21/2066* (2013.01)

(58) Field of Classification Search
  CPC .............. G03B 21/204; G03B 21/2013; G03B 21/2066; G03B 21/208; G03B 33/08; G02B 26/008; G02B 27/1046; G02B 27/1006

See application file for complete search history.

(56) References Cited

U.S. PATENT DOCUMENTS

| 8,757,814 | B2 | 6/2014 | Masuda | |
|---|---|---|---|---|
| 2019/0158791 | A1* | 5/2019 | Otani | ................. F21V 29/70 |
| 2020/0314396 | A1* | 10/2020 | Fan | ................. H04N 9/3152 |
| 2021/0255532 | A1* | 8/2021 | Pan | ................. G03B 21/204 |
| 2021/0294200 | A1* | 9/2021 | Pan | ................. H04N 9/3164 |
| 2021/0382381 | A1* | 12/2021 | Akiyama | ........... G03B 21/2066 |
| 2022/0163811 | A1* | 5/2022 | Chen | ................. G02B 27/141 |

FOREIGN PATENT DOCUMENTS

| CN | 110874001 | 3/2020 |
|---|---|---|
| TW | 201344333 | 11/2013 |

* cited by examiner

*Primary Examiner* — Magda Cruz
(74) *Attorney, Agent, or Firm* — JCIPRNET

(57) ABSTRACT

An illumination system and a projection device are provided. The illumination system includes a first laser light source providing a first laser light, a wavelength conversion module, a first light splitting element and a microlens array. When the first laser light is incident to at least one non-conversion region of the wavelength conversion module, the first laser light forms a first color light. When the first laser light is incident to at least one wavelength conversion region of the wavelength conversion module, the first laser light forms at least one second color light. The microlens array is located on a transmission path of the first color light and the at least one second color light, and the first color light and the at least one second color light form an illumination light after passing through the microlens array.

19 Claims, 15 Drawing Sheets

ILLUMINATION SYSTEM AND PROJECTION DEVICE

CROSS-REFERENCE TO RELATED APPLICATION

This application claims the priority benefit of Chinese application no. 202011586804.6, filed on Dec. 29, 2020. The entirety of the above-mentioned patent application is hereby incorporated by reference herein and made a part of this specification.

BACKGROUND

Technical Field

The disclosure relates to an optical system and an optical device; particularly, the disclosure relates to an illumination system and a projection device.

Description of Related Art

Recently, projection apparatuses based on solid-state light sources such as light-emitting diodes (LEDs) and laser diodes (LDs) have gradually gained a place in the market. Since the laser diodes have a luminous efficiency of about 20% higher, in order to break through the light source limitation of the light-emitting diodes, projector models that take the laser light source as the required light source are gradually developed.

Generally speaking, a projection device that takes at least one laser diode as a light source includes optical modules such as a wavelength conversion module, a filter module, a light valve, and a projection lens. Specifically, the filter module is disposed on a downstream light path of the wavelength conversion module, such that after color lights of different wavelength bands outputted from the wavelength conversion module pass through the filter module, predetermined color lights are filtered out for purifying the color of each of the color lights and achieving color saturation. Moreover, uniformity of these color lights is also adjusted through a light uniforming element. After that, these color lights are modulated by the light valve to form an image light and then projected to the outside through a projection lens.

Generally speaking, in the conventional optical system, the light uniforming element may be an integral rod/integral pipe or a microlens array. Furthermore, the integral rod may be a rectangular cross-section rod of an optical material, a hollow rod formed by four mirrors, or a solid glass rod. Multiple virtual images may be formed after the light is internally reflected multiple times in the rod and passes through the rod. When viewed inward from outside of the light emitting surface of the integral rod, several virtual images can be seen, so that the light passing through are homogenized. As the integral rod increases in length, the virtual images generated increase in quantity, and the homogenization is improved. However, the required space for the light path will also increase. On the other hand, the microlens array divides the light passing through into many portions with the microlenses thereon, and each portion may be regarded as a point light source. In addition, when light passing through one of the microlenses is superimposed on a projection surface with light passing through other of the microlenses, a uniform image formed on the projection surface may be obtained. Compared with the integral rod, when the microlens array is adopted as the light uniforming element of the optical system, the space required for the light path with the microlens array is smaller, facilitating an application of projectors requiring a small size.

Generally speaking, the filter module of the projection device is disposed at the focal point of optical elements on the light path. When the integral rod is adopted as the light uniforming element, the filter module may be disposed at the entrance end or exit end of the integral rod to minimize the size of the filter module. However, when the microlens array is adopted as a light uniforming element, the light incident on the microlens array is required to be a collimated light with a specific light spot area, thus causing difficulty in disposing the corresponding filter module. If the size of the filter module is to be minimized, a corresponding focusing lens group and collimating lens group are required to be disposed, thus increasing the space required for the optical system, unfavorable for an application of projectors requiring a small size. However, if the size of the filter module is not minimized, it is also unfavorable for an application of projectors requiring a small size.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an illumination system having a small size.

The disclosure provides a projection device having a small size.

Other objectives and advantages of the invention may be further illustrated by the technical features broadly embodied and described as follows.

In order to achieve one, some, or all of the above objectives or other objectives, an embodiment of the disclosure proposes an illumination system. The illumination system is configured to provide an illumination light, and the illumination system includes a first laser light source, a wavelength conversion module, a first light splitting element, and a microlens array. The first laser light source is configured to provide a first laser light. The wavelength conversion module is located on a transmission path of the first laser light. The wavelength conversion module includes at least one wavelength conversion region and at least one non-conversion region, and the wavelength conversion module is configured to rotate, such that the at least one wavelength conversion region and the at least one non-conversion region are alternately cut into the transmission path of the first laser light. The first light splitting element is located on the transmission path of the first laser light. When the first laser light is incident to the at least one non-conversion region of the wavelength conversion module, the first laser light forms a first color light through the first light splitting element and the at least one non-conversion region of the wavelength conversion module, and when the first laser light is incident to the at least one wavelength conversion region of the wavelength conversion module, the first laser light forms at least one second color light through the first light splitting element and the wavelength conversion module. The microlens array is located on transmission paths of the first color light and the at least one second color light, and is configured to homogenize the first color light and the at least one second color light. The first color light and the at least one second color light form the illumination light after passing through the microlens array In order to achieve one, some, or all of the above objectives or other objectives, an embodiment of the disclosure proposes a projection device. The projection device includes the above-mentioned illumination system, a light valve, and a projection lens. The light valve is located on a transmission path of the illumination light from the illumination system and is configured to convert the illumination light into an image light. The projection lens is located on a transmission path of the image light and is configured to project the image light out of the projection device.

In order to achieve one, some, or all of the above objectives or other objectives, an embodiment of the disclosure proposes an illumination system. The illumination system is configured to provide an illumination light, and the illumination system includes a first laser light source, a wavelength conversion module, a filter module, and a microlens array. The first laser light source is configured to provide a first laser light. The wavelength conversion module is located on a transmission path of the first laser light. The wavelength conversion module includes at least one wavelength conversion region, and the wavelength conversion module is configured to rotate, such that the at least one wavelength conversion region is moved into the transmission path of the first laser light. The filter module is located on the transmission path of the first laser light. The filter module has a first surface and a second surface opposite to each other, where the first surface faces the wavelength conversion module. The filter module is disposed with a transmissive region and a splitting region on the first surface, and a diffusing region and a filter optical region on the second surface, where the diffusing region and the transmissive region are opposite to each other, and the splitting region and the filter optical region are opposite to each other. The filter module is configured to rotate, such that the transmissive region and the splitting region are cut into the transmission path of the first laser light in turn. When the transmissive region is cut into the transmission path of the first laser light, the first laser light forms a first color light after passing through the transmissive region and the diffusing region of the filter module, and when the splitting region is cut into the transmission path of the first laser light, the first laser light forms at least one second color light after being sequentially transmitted to the splitting region of the filter module, the at least one wavelength conversion region of the wavelength conversion module, and the filter optical region of the filter module. The microlens array is located on transmissions path of the first color light and the at least one second color light, and is configured to homogenize the first color light and the at least one second color light, where the first color light and the at least one second color light form the illumination light after passing through the microlens array.

In order to achieve one, some, or all of the above objectives or other objectives, an embodiment of the disclosure proposes a projection device. The projection device includes the above-mentioned illumination system, a light valve, and a projection lens. The light valve is located on a transmission path of the illumination light from the illumination system and is configured to convert the illumination light into an image light. The projection lens is located on a transmission path of the image light and is configured to project the image light out of the projection device.

Based on the foregoing, the embodiments of the disclosure have at least one of following advantages or effects. In an embodiment of the disclosure, the projection device and the illumination system may omit a filter module to achieve a small size by arranging the microlens array as the light uniforming element, so as to facilitate an application of projectors requiring a small size. On the other hand, in another embodiment of the disclosure, the corresponding splitting region and filter optical region are disposed on the two surfaces of the filter module in the projection device and the illumination system, such that the filter module may be disposed in the top portion of light path of the wavelength conversion module of the projection device and the illumination system. In this way, the filter module and the wavelength conversion module and the light pattern adjusting lens group are cooperated to minimize the sizes of the wavelength conversion module and the filter module at the same time. In addition, a small size is achieved since the microlens array serving as the light uniforming element is independently disposed in the bottom portion of light path of the filter module and the wavelength conversion module, so as to facilitate an application of projectors requiring a small size.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
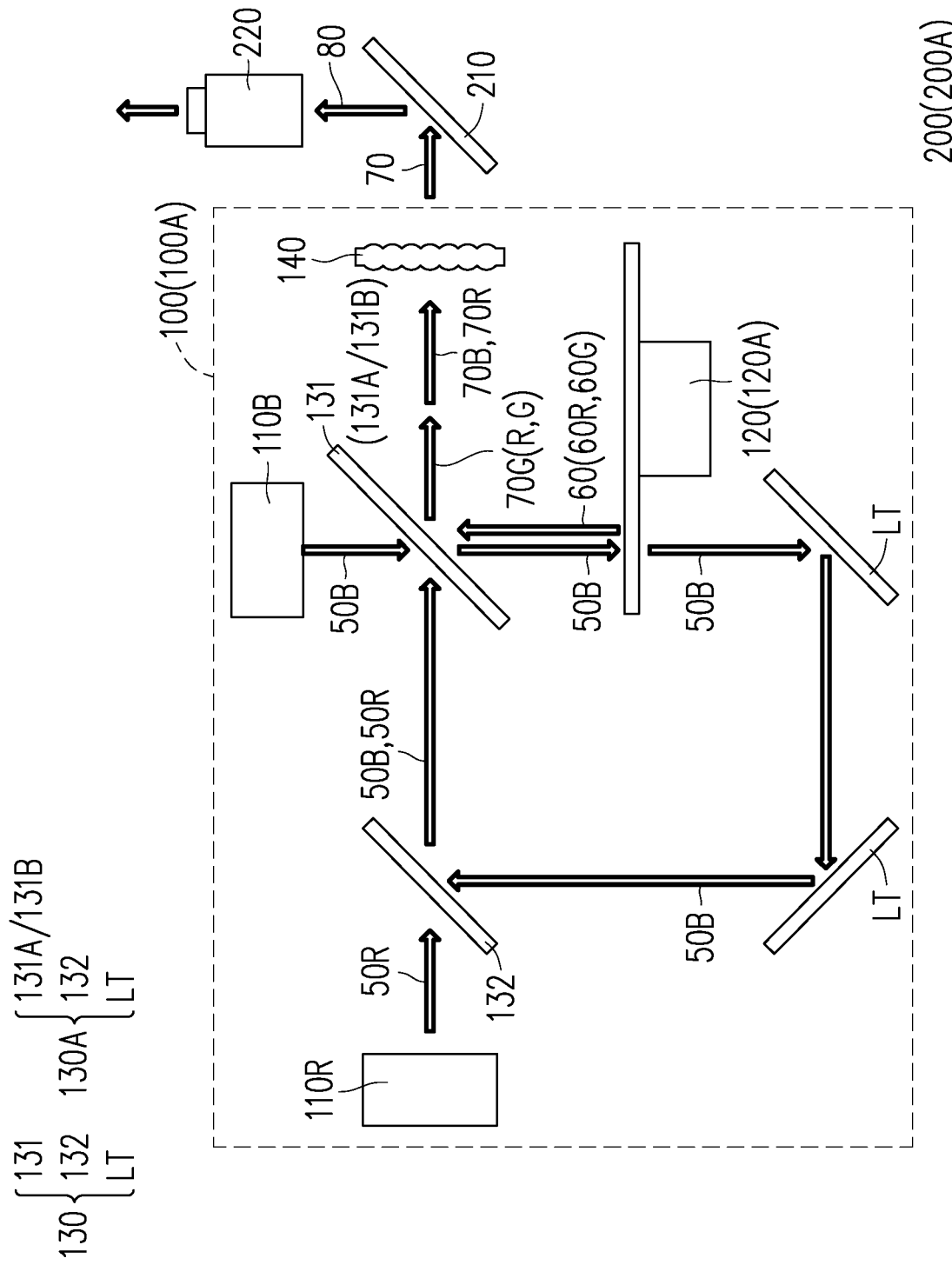
FIG. 1 is a schematic structural diagram of a projection device according to an embodiment of the disclosure.
Figure 2A:
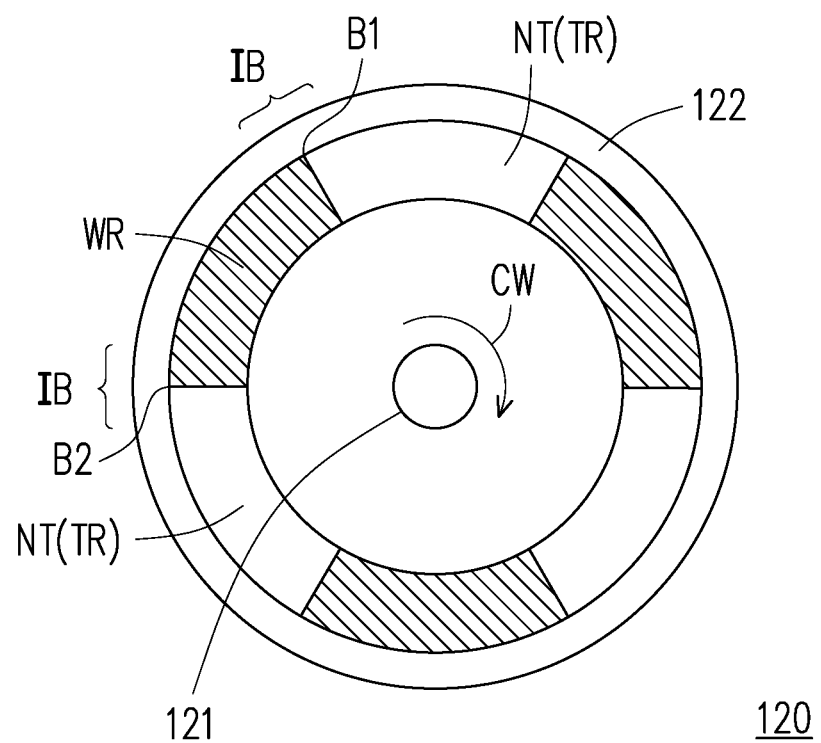
FIG. 2A is a top view of a wavelength conversion module of FIG. 1.
Figure 2B:
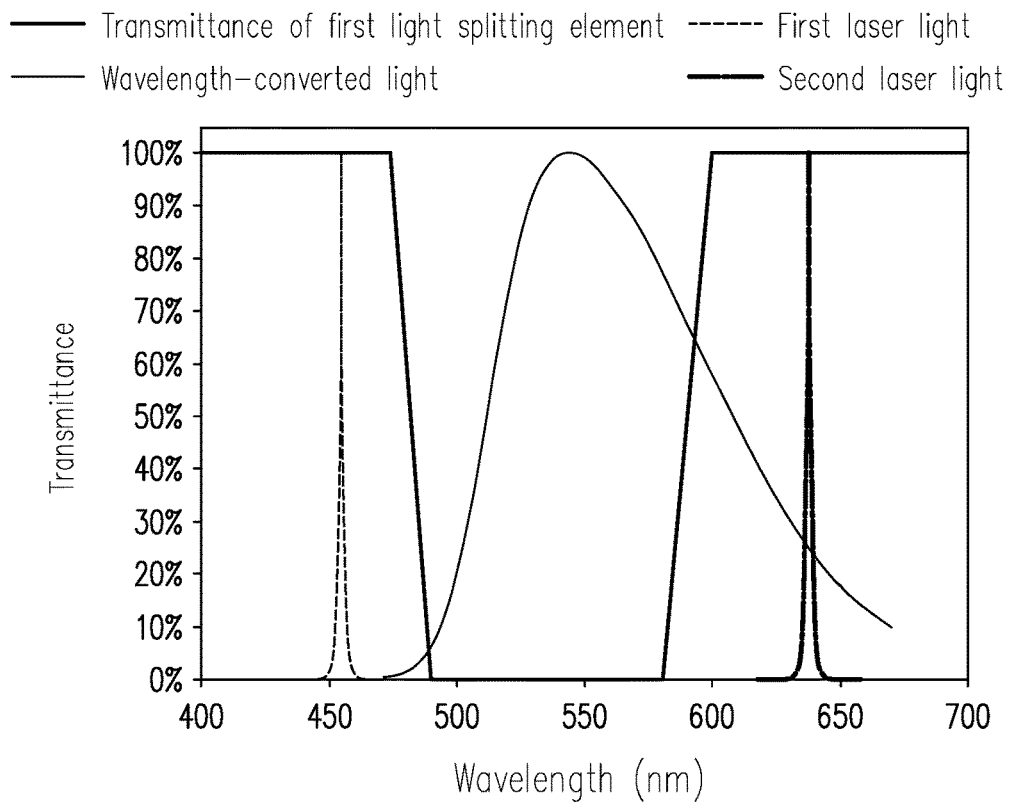
FIG. 2B is a relationship diagram of transmittance of a first light splitting element of FIG. 1 with respect to light of different wavelength bands.
Figure 2C:
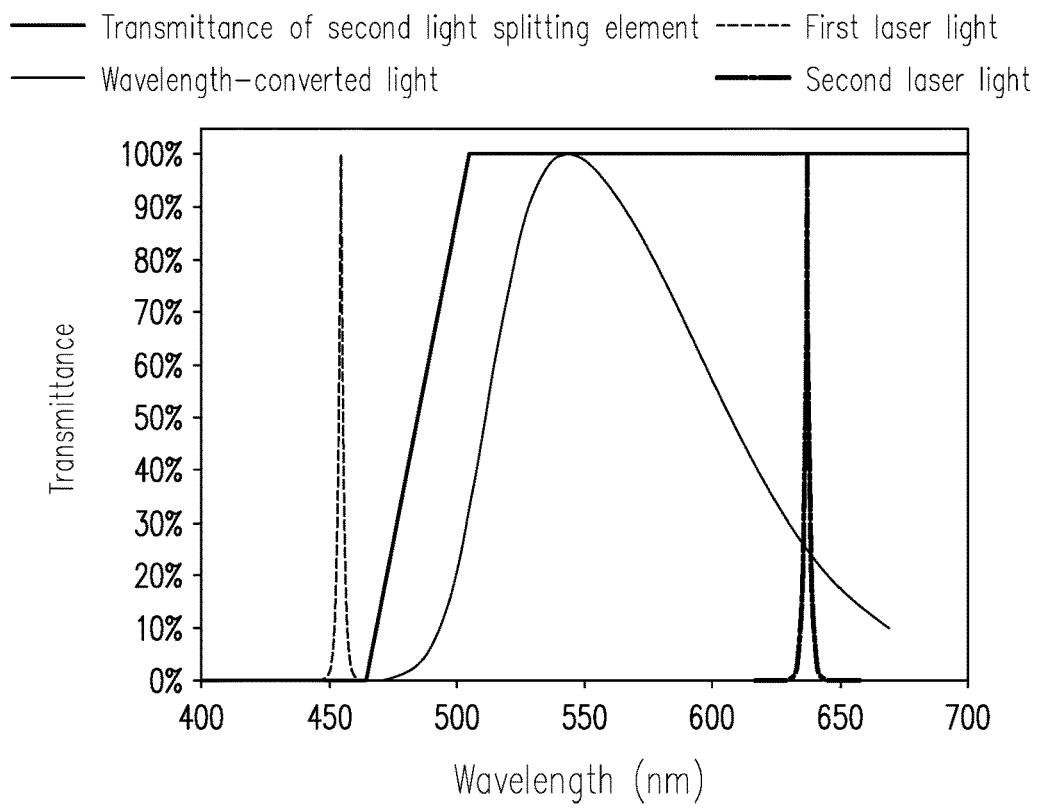
FIG. 2C is a relationship diagram of transmittance of a second light splitting element of FIG. 1 with respect to light of different wavelength bands.
Figure 2D:
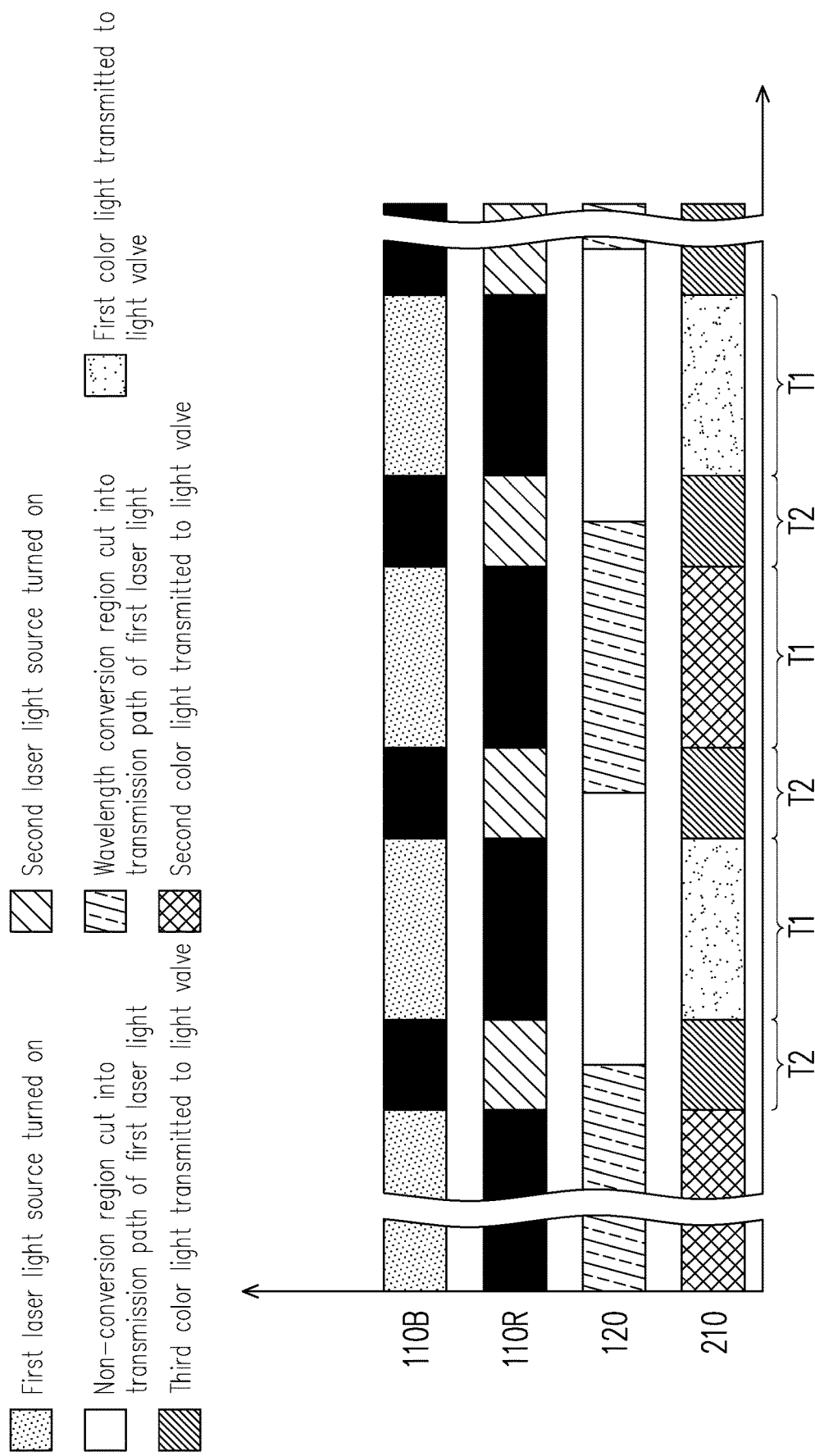
FIG. 2D is a schematic timing diagram of a first laser light source, a second laser light source, a wavelength conversion module, and a light valve of FIG. 2A in different time intervals.

FIG. 1 is a schematic structural diagram of a projection device according to an embodiment of the disclosure. FIG. 2A is a top view of a wavelength conversion module of FIG. 1. FIG. 2B is a relationship diagram of transmittance of a first light splitting element of FIG. 1 with respect to light of different wavelength bands. FIG. 2C is a relationship diagram of transmittance of a second light splitting element of FIG. 1 with respect to light of different wavelength bands. FIG. 2D is a schematic timing diagram of a first laser light source, a second laser light source, a wavelength conversion module, and a light valve of FIG. 2A in different time intervals. With reference to FIG. 1, a projection device 200 includes an illumination system 100, a light valve 210, and a projection lens 220. The illumination system 100 is adapted to provide an illumination light 70. The light valve 210 is disposed on a transmission path of the illumination light 70, and the light valve 210 is adapted to convert the illumination light 70 into an image light 80. The projection lens 220 is disposed on a transmission path of the image light 80, and the projection lens 220 is adapted to project the image light 80 out of the projection device 200 to form an image. In this embodiment, single the light valve 210 may be arranged inside the projection device 200, but the disclosure is not limited thereto. In another embodiment, a plurality of light valves may be arranged inside the projection device 200. Besides, in this embodiment, the light valve 210 may be a digital micro-mirror device (DMD) or a liquid-crystal-on-silicon panel (LCOS panel). However, in another embodiment, the light valve 210 may also include a transmissive liquid crystal panel or other light modulators.

Specifically, as shown in FIG. 1, in this embodiment, the illumination system 100 includes a first laser light source 110B, a second laser light source 110R, a wavelength conversion module 120, a light splitting and combining module 130, and a light homogenizing element 140. Furthermore, as shown in FIG. 2D, in this embodiment, the first laser light source 110B is turned on in a first time interval T1 and turned off in a second time interval T2. The second laser light source 110R is turned off in the first time interval T1 and turned on in the second time interval T2. In this way, as shown in FIG. 1 and FIG. 2D, the first laser light source 110B provides a first laser light 50B in the first time interval T1, and the second laser light source 110R provides a second laser light 50R in the second time interval T2. For example, in this embodiment, the first laser light 50B is a blue laser light, and the second laser light 50R is a red laser light. For example, in this embodiment, the first laser light source 110B may include one or more blue laser diodes arranged into an array, the second laser light source 110R may include one or more red laser diodes arranged into an array, but the disclosure is not limited thereto.

Specifically, as shown in FIG. 1, in this embodiment, the light splitting and combining module 130 includes a first light splitting element 131, at least one light transmitting element LT, and a second light splitting element 132. The light splitting and combining module 130 is located on transmission paths of the first laser light 50B and the second laser light 50R, and the first light splitting element 131 is disposed corresponding to the first laser light source 110B and is located between the first laser light source 110B and the wavelength conversion module 120. For example, as shown in FIG. 2B, in this embodiment, the first light splitting element 131 reflects light with a wavelength range between 480 nm (nanometers) and 590 nm, and transmits light with wavelength range of less than 480 nm and more than 590 nm. In other words, the first light splitting element 131 may be a dichroic mirror for reflecting green light and transmitting blue light and red light. Therefore, the first light splitting element 131 allows the blue first laser light 50B to pass through. In this way, the first laser light 50B emitted from the first laser light source 110B may be transmitted to the wavelength conversion module 120 after passing through the first light splitting element 131.

On the other hand, as shown in FIG. 1, in this embodiment, the second light splitting element 132 of the light splitting and combining module 130 is located between the second laser light source 110R and the first light splitting element 131, the second light splitting element 132 is disposed on a transmission path of the second laser light 50R emitted by the second laser light source 110R, and the at least one light transmitting element LT is located on a light path of the first laser light 50B between the wavelength conversion module 120 and the second light splitting element 132. For example, as shown in FIG. 2C, in this embodiment, the second light splitting element 132 allows light with a wavelength range from 470 nm to 600 nm to pass through, and reflects light with a wavelength range of less than 470 nm. In other words, the second light splitting element 132 is a dichroic mirror for reflecting blue light and transmitting light of other colors (e.g., red light, green light and yellow light), and the at least one light transmitting element LT reflects visible light. In the embodiment of FIG. 1, the at least one light transmitting element LT is, for example, a reflector or other reflective elements.

Moreover, as shown in FIG. 1 and FIG. 2A, in this embodiment, the wavelength conversion module 120 is located on the transmission path of the first laser light 50B and is adapted to rotate. Furthermore, as shown in FIG. 1 and FIG. 2A, the wavelength conversion module 120 includes a rotating shaft 121 and a substrate 122. The rotating shaft 121 is connected to the substrate 122, and is configured to drive the substrate 122 to rotate around it. The wavelength conversion module 120 is disposed on the transmission path of the first laser light 50B, and at least one non-conversion region NT and at least one wavelength conversion region WR are disposed on the substrate 122 of the wavelength conversion module 120. For example, as shown in FIG. 2A, in this embodiment, an area of the at least one non-conversion region NT is the same as an area of the at least one wavelength conversion region WR, but the disclosure is not limited thereto. In another embodiment not shown, the area of the at least one non-conversion region NT may be different from the area of the at least one wavelength conversion region WR.

Specifically, in this embodiment, the at least one non-conversion region NT of the wavelength conversion module 120 is formed with a transparent layer. That is to say, in this embodiment, the at least one non-conversion region NT is a light transmissive region TR, and when the at least one non-conversion region NT is cut into the transmission path of the first laser light 50B, the first laser light 50B passes through the at least one non-conversion region NT and subsequent optical elements to form a first color light 70B. On the other hand, the at least one wavelength conversion region WR of the wavelength conversion module 120 is formed with a wavelength conversion layer, and is configured to convert the first laser light 50B into a wavelength-converted light 60. For example, in this embodiment, the wavelength conversion layer includes a wavelength conversion material which may be phosphor powder adapted to be excited to produce a yellow color light. Therefore, when the at least one wavelength conversion region WR is cut into the transmission path of the first laser light 50B, the wavelength-converted light 60 is formed after the first laser light 50B is irradiated on the wavelength conversion layer, and the wavelength-converted light 60 is yellow light.

Furthermore, as shown in FIG. 2A, a standby region IB is defined between the at least one wavelength conversion region WR and the at least one non-conversion region NT. In this way, as shown in FIG. 2A, the number of the at least one wavelength conversion region WR and the number of the at least one non-conversion region NT of the wavelength conversion module 120 are respectively three. When the wavelength conversion module 120 rotates around the rotating shaft 121, the wavelength conversion region WR, the standby region IB, and the non-conversion region NT are sequentially rotated along a direction CW. For example, in this embodiment, the direction CW is a clockwise direction. In addition, for example, in this embodiment, the standby region IB may be a boundary region of the wavelength conversion region WR or the non-conversion region NT. Specifically, in this embodiment, as shown in FIG. 2A, the standby region IB includes a first boundary B1 between one end of the wavelength conversion region WR and one end of the non-conversion region NT connected thereto, and a second boundary B2 between the other end of the wavelength conversion region WR and the other end of the non-conversion region NT connected thereto.

Furthermore, as shown in FIG. 2A and FIG. 2D, in this embodiment, when the wavelength conversion module 120 rotates around the rotating shaft 121, in the second time interval T2, a portion of the non-conversion region NT adjacently connected to the first boundary B1, the first boundary B1, and a portion of the wavelength conversion region WR adjacently connected to the first boundary B1 are sequentially cut into the transmission path of the first laser light 50B formed in the time intervals (i.e., the first time interval T1) in which the first laser light source 110B is turned on. Alternatively, a portion of the wavelength conversion region WR adjacently connected to the second boundary B2, the second boundary B2, and a portion of the non-conversion region NT adjacently connected to the second boundary B2 are sequentially cut into the transmission path of the first laser light 50B formed in the time intervals (i.e., the first time interval T1) in which the first laser light source 110B is turned on.

More specifically, in this embodiment, the standby region IB may be a virtual region and no light is incident on the standby region IB in all time intervals. During the time intervals which the first laser light source 110B is turned off (i.e., the second time interval T2), a position of the wavelength conversion module 120 which is moved to the transmission path of the first laser light 50B formed in the first time interval T1 is a corresponding position of the standby region IB. That is to say, the illumination system 100 controls a timing when the standby region IB of the wavelength conversion module 120 is moved into the light transmission path in the second time interval T2, and the light transmission path is formed by the first laser light 50B in the first time interval T1. However, since the first laser light source 110B is turned off at this second time interval, no first laser light 50B and/or no second laser light 50R pass through the standby region IB of the wavelength conversion module 120, no light spot is formed on the wavelength conversion module 120 by the first laser light 50B either, and thus no image discoloration caused by the spoke state is generated. Therefore, the projection device 200 does not require to turn off the light valve 210 during the operation of the light valve 210 to reduce image discoloration, thus maintaining brightness of the display screen.

Furthermore, as shown in FIG. 1, FIG. 2A and FIG. 2D, in the first time interval T1, the first laser light 50B forms a light spot on the wavelength conversion module 120, and the light spot is completely located on the non-conversion region NT. Namely, the first laser light 50B passes through the non-conversion region NT, and is transmitted by the at least one light transmitting element LT and the second light splitting element 132 to the first light splitting element 131 to form the first color light 70B. On the other hand, as shown in FIG. 1 and FIG. 2D, in the second time interval T2, since the second laser light source 110R is turned on, the second laser light 50R provided by the second laser light source 110R passes through the second light splitting element 132 and is transmitted to the first light splitting element 131 to form a third color light 70R, where the third color light 70R is, for example, red light.

Besides, in another first time interval T1, the first laser light 50B forms a light spot on the wavelength conversion module 120, and the light spot is completely located on the wavelength conversion region WR. In this way, the wavelength conversion module 120 converts the first laser light 50B into the wavelength-converted light 60 of a yellow color through the wavelength conversion material. Then, the wavelength-converted light 60 is transmitted to the first light splitting element 131, and filtered into a second color light 70G with a narrower spectrum range by the first light splitting element 131, where the second color light 70G is, for example, green light. In addition, since human eyes are visually more sensitive to green light, as purity or brightness of the green light increases, the brightness of the display image perceived by the human eyes also increases. In this way, the illumination system 100 and the projection device 200 obtains the second color light 70G (green light) with the narrower spectrum range (i.e., higher purity) by the arrangement of the first light splitting element 131, so as to facilitate an increase in the brightness of the display image in the human eyes.

Next, as shown in FIG. 1, the illumination light 70 is formed when the first color light 70B, the third color light 70R, and the second color light 70G are outputted from the first light splitting element 131. In addition, in this embodiment, the first color light 70B is blue light, the third color light 70R is red light, and the second color light 70G is green light. That is to say, the illumination system 100 is capable of providing the illumination light 70 with RGB color light by the arrangement of the first laser light source 110B, the second laser light source 110R, and the wavelength conversion module 120. Therefore, the projection device 200 and the illumination system 100 may omit a filter module (filter wheel), so as to reduce loss of brightness and achieve a 100% RGB color light output ratio (CLO ratio), and achieve a small size by arranging a microlens array as the light homogenizing element 140, so as to facilitate an application to projectors requiring a small size.

In addition, as shown in FIG. 1, in this embodiment, the light homogenizing element 140 is located on the transmission path of the illumination light 70. In this embodiment, the light homogenizing element 140 is a microlens array, but the disclosure is not limited thereto. To be more specific, as shown in FIG. 1, when the illumination light 70 is transmitted to the light homogenizing element 140, the light homogenizing element 140 homogenizes the illumination light 70 and transmits the homogenized illumination light 70 to the light valve 210.

Next, as shown in FIG. 1, the light valve 210 is located on the transmission path of the illumination light 70 from the light homogenizing element 140, and is configured to convert the illumination light 70 into the image light 80. The projection lens 220 is located on the transmission path of the image light 80 from the light valve 210, and is configured to project the image light 80 out of the projection device 200 to form an image. After the illumination light 70 is converged to the light valve 210, the light valve 210 sequentially converts the illumination light 70 into the image light 80 of different colors and transmits the image light 80 of different colors to the projection lens 220, such that the image formed by projecting the image light 80 of different colors is thus a color image.

Furthermore, in this embodiment, the first color light 70B is blue light, the third color light 70R is red light, and the second color light 70G is green light. Since the illumination light 70 is formed by the first color light 70B, the third color light 70R, and the second color light 70G, a color tone or a color temperature of the illumination light 70 may be determined by a proportional relationship between the first color light 70B, the third color light 70R, and the second color light 70G. In addition, a color tone or a color temperature of the image light 80 formed by the illumination light 70 is also determined by the above proportional relationship. In this way, in the projection device 200 and the illumination system 100 of this embodiment, the relative proportion between the first color light 70, the third color light 70R, and the second color light 70G of the illumination light 70 is adjusted through the durations of the respective time intervals in which the first laser light source 110B and the second laser light source 110R are turned on, and the configuration of the wavelength conversion region WR and the non-conversion region NT of the wavelength conversion module 120. Therefore, in the illumination system 100 and the projection device 200, the color temperature of the image light 80 is adjusted without adjusting the intensity of the first laser light source 110B or the second laser light source 110R, for preventing the brightness loss of the display image In this way, the required color light may be formed in different time intervals by arrangement of the first laser light source 110B, the second laser light source 110R, and the wavelength conversion module 120 in the illumination system 100 and the projection device 200, and image discoloration caused by the spoke state is prevented, thus maintaining the brightness of the display image. In addition, the projection device 200 and the illumination system 100 may omit a filter module, reducing loss of brightness so as to achieve a 100% RGB color light output ratio, and achieve a small size by arranging a microlens array as the light homogenizing element 140, so as to facilitate an application of projectors requiring a small size.

Besides, as shown in FIG. 2A, in this embodiment, a connecting boundary of one end of a wavelength conversion region WR and one end of a non-conversion region NT connected thereto is the first boundary B1; a connecting boundary of the other end of the wavelength conversion region WR and one end of another non-conversion region NT connected thereto is the second boundary B2; and a connecting boundary of the other end of the another non-conversion region NT and one end of another wavelength conversion region WR connected thereto is defined as another first boundary B1, where the standby region IB includes the region where the first boundary B1 and the second boundary B2 are located. According to the above definition, as the non-conversion regions NT and the wavelength conversion regions WR of the wavelength conversion module 120 increases in quantity, the corresponding standby regions IB also increases in quantity, and thus the frequency of switching between the first laser light source 110B and the second laser light source 110R accordingly increases, namely the ON duration and Off duration of the light sources accordingly decrease, which is equivalent to that the cycle duration of forming the image light 80 with blue light, red light, and green light by the light valve 210 accordingly decreases.

In this way, a color update rate of an image of the projection device 200 adopting a wavelength conversion module with a larger number of standby regions IB accordingly increases to prevent the color break issue and achieve smoother viewing quality. However, due to various limitations such as a swing rate of the light valve 210 (ex. DMD), a response time of On and Off operation of the first laser light source 110B and the second laser light source 110R, and that a size of the non-conversion region NT and the wavelength conversion region WR of the wavelength conversion module is required to be larger than a size of the laser light spot, in another embodiment of the disclosure, the number of the non-conversion region NT and the number of the wavelength conversion region WR of the wavelength conversion module may each be increased to ten or so.

In this way, depending on the viewing quality required by a user, the number of the non-conversion region NT, the wavelength conversion region WR, and the corresponding standby region IB of the wavelength conversion module 120 may be selectively designed to meet the actual color update rate requirements. In this way, in the embodiment of the disclosure, the first laser light source 110B and the second laser light source 110R in the illumination system 100 and the projection device 200 may also be simply and non-limitedly switched between an on or off state through illumination control, thus increasing the color update rate of the projection device 200 and eliminating the color break issue, so as to achieve smoother viewing quality.

Besides, although it is taken as an example in this embodiment that the standby region IB is present between the non-conversion region NT and the wavelength conversion region WR, the disclosure is not limited thereto. In another embodiment, when the wavelength conversion module includes a plurality of wavelength conversion regions WR, and two wavelength conversion regions WR which respectively generate the wavelength-converted lights of different color are adjacent to each other, the standby region IB is also disposed between the two wavelength conversion regions WR to eliminate image discoloration caused by the spoke state. With reference to the disclosure, it should be obvious to any person skilled in the art that appropriate modifications may be made to the configuration of the relevant regions of the wavelength conversion module and the light path system thereof, so as to achieve similar effects and advantages as those of the projection device 200, but should still fall into the scope of the disclosure. Hereinafter, some other embodiments will be provided for explanation.

Figure 3A:
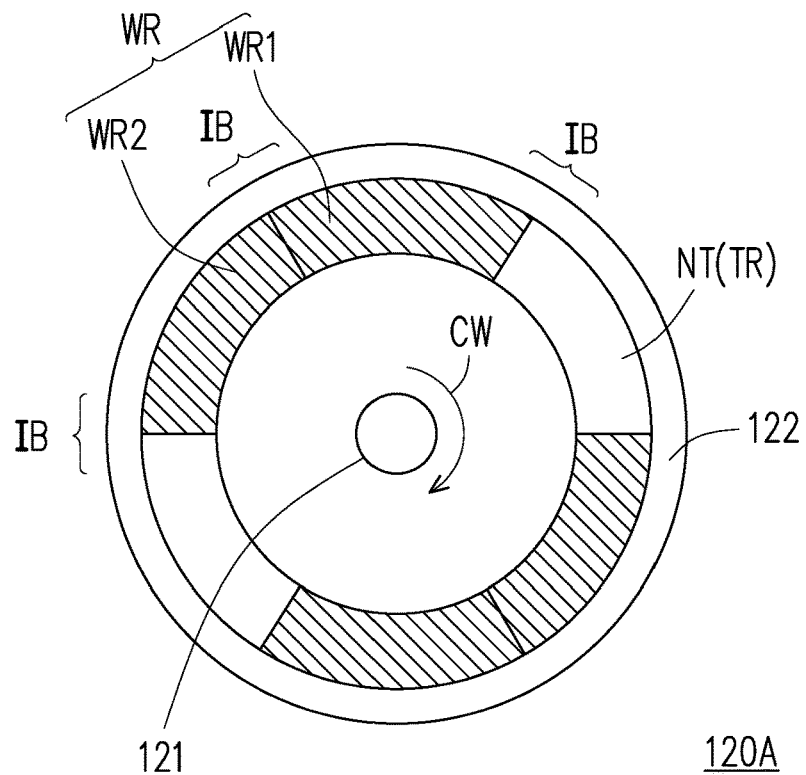
FIG. 3A is a top view of another wavelength conversion module of FIG. 1.
Figure 3B:
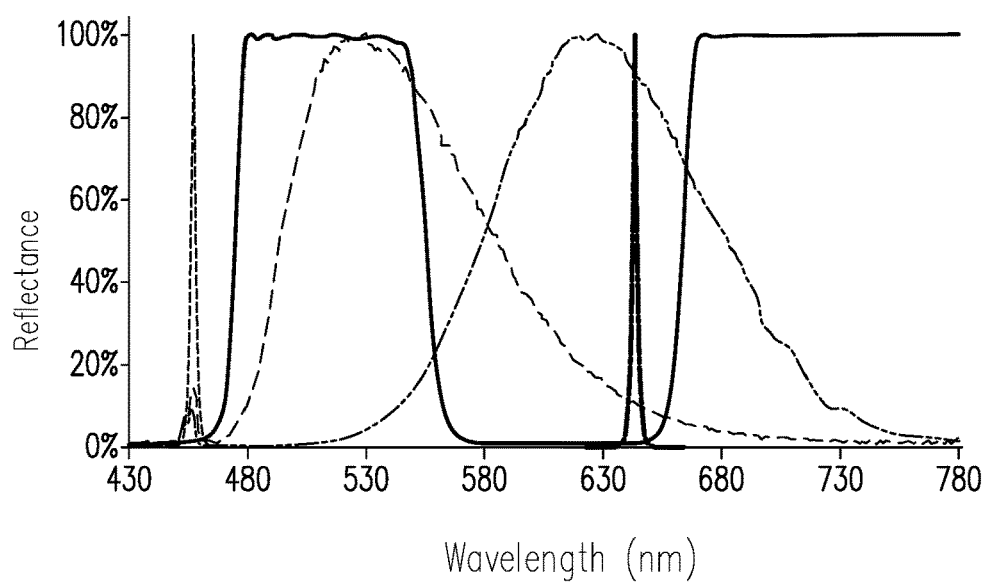
FIG. 3B is a relationship diagram of reflectance of another first light splitting element of FIG. 1 with respect to light of different wavelength bands.

FIG. 3A is a top view of another wavelength conversion module of FIG. 1. FIG. 3B is a relationship diagram of reflectance of another first light splitting element of FIG. 1 with respect to light of different wavelength bands. A wavelength conversion module 120A of FIG. 3A is similar to the wavelength conversion module 120 of FIG. 2A, with the following differences. As shown in FIG. 3A to FIG. 3B, in this embodiment, the at least one wavelength conversion region WR of the wavelength conversion module 120A includes a first wavelength conversion region WR1 and a second wavelength conversion region WR2, where the first wavelength conversion region WR1 and the second wavelength conversion region WR2 are respectively formed with different wavelength conversion layers. For example, in this embodiment, a wavelength conversion material of the wavelength conversion layer located in the first wavelength conversion region WR1 may be phosphor powder configured to be excited to produce a red color light, and a wavelength conversion material of the wavelength conversion layer located in the second wavelength conversion region WR2 may be phosphor powder configured to be excited to produce a green color light.

In addition, as shown in FIG. 1, in this embodiment, when the wavelength conversion module 120A is applied to the embodiment of FIG. 1, the structure of an illumination system 100A and a projection device 200A may be formed, and the first light splitting element disposed in the illumination system 100A is a first light splitting element 131A. Moreover, as shown in FIG. 3B, the first light splitting element 131A is a dichroic mirror which reflects light with a part of red wavelength range and light with green wavelength range, and transmits light with other colors (e.g., blue light) and light with other part of red wavelength range.

In this way, the first light splitting element 131A may still allow the first laser light 50B to pass through and guide the first laser light 50B to the wavelength conversion module 120A. When the first wavelength conversion region WR1 is located on the transmission path of the first laser light 50B, the first laser light 50B may be converted into a red wavelength-converted light 60R by the wavelength conversion material thereon. When the second wavelength conversion region WR2 is located on the transmission path of the first laser light 50B, the first laser light 50B may be converted into a green wavelength-converted light 60G through the wavelength conversion material thereon. In addition, when the wavelength-converted light 60R and the wavelength-converted light 60G are transmitted to the first light splitting element 131A, the wavelength-converted light 60R and the wavelength-converted light 60G are reflected by the first light splitting element 131A to respectively form a first sub-color light R and a second sub-color light G, where the first sub-color light R is, for example, red light, and the second sub-color light G is, for example, green light. Moreover, in this embodiment, since the first color light 70B is blue light, peak wavelength ranges of the first color light 70B, the first sub-color light R, and the second sub-color light G do not overlap each other. The second laser light 50R emitted by the second laser light source 110R forms the third color light 70R after passing through the first light splitting element 131A, where the third color light 70R is red light. Therefore, the wavelength range of the third color light 70R overlap that of the wavelength-converted light 60R. A portion of the wavelength-converted light 60R with a wavelength range of greater than 650 nm is reflected by the first light splitting element 131A to form the first sub-color light R, and the second laser light 50R passes through the first light splitting element 131A to form the third color light 70R. The red light in the illumination light 70 is formed from the first sub-color light R, and the third color light 70R by the first light splitting element 131A.

In this way, as shown in FIG. 1, in the illumination system 100A and projection device 200A, the first color light 70B, the third color light 70R, the first sub-color light R, and the second sub-color light G form the illumination light 70 by being guided through the first light splitting element 131A. Therefore, the illumination light 70 of the illumination system 100A containing RGB color lights is formed by arrangement of the first laser light source 110B, the second laser light source 110R, and the wavelength conversion module 120A. The illumination system 100A and the projection device 200A may omit a filter module (filter wheel), so as to reduce loss of brightness and achieve a 100% RGB color light output ratio (CLO ratio), and achieve a small size by arranging a microlens array as the light homogenizing element 140, so as to facilitate an application of projectors requiring a small size. In this way, by arranging the wavelength conversion module 120A, the illumination system 100A and the projection device 200A may achieve the advantages of the illumination system 100 and the projection device 200 as above-mentioned, which will not be repeatedly described herein.

On the other hand, although it is taken as an example in the foregoing embodiment that the non-conversion region NT is the light transmissive region TR, the disclosure is not limited thereto. In another embodiment, the non-conversion region NT may be a light reflecting region RR. With reference to the disclosure, it should be obvious to any person skilled in the art that appropriate modifications may be made to the light path design of the illumination system 100, so as to achieve similar effects and advantages as those of the projection device 200, but should still fall into the scope of the disclosure. Hereinafter, some other embodiments will be provided for explanation.

Figure 3C:
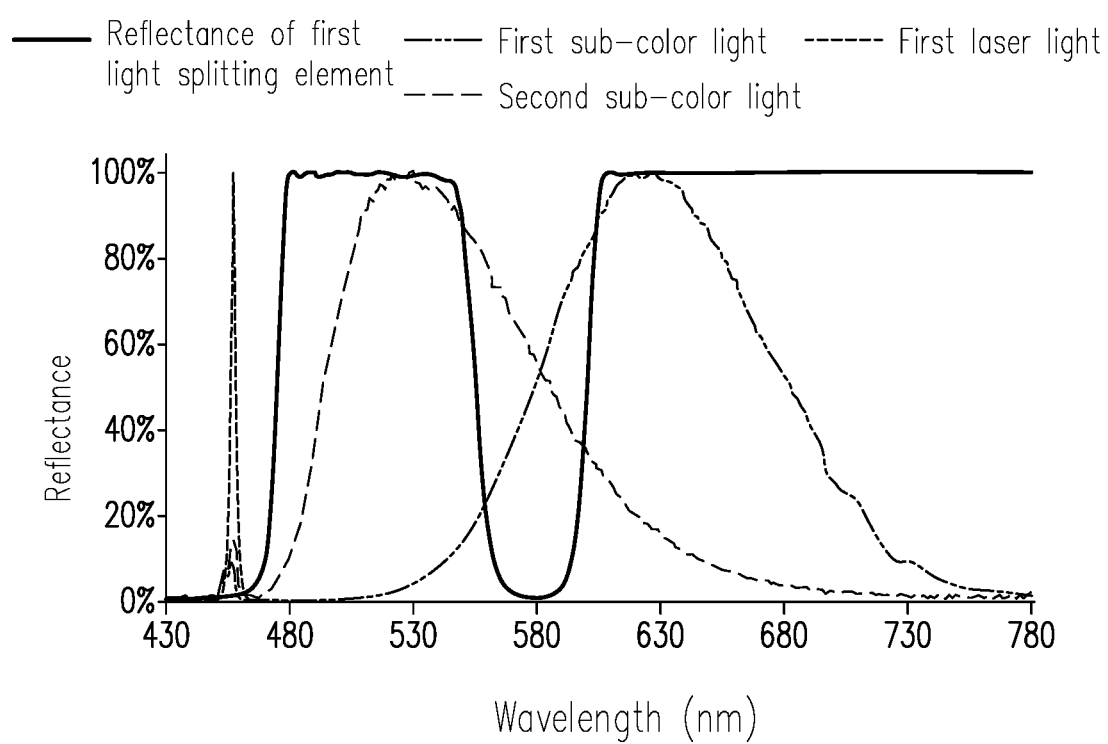
FIG. 3C is a relationship diagram of reflectance of another first light splitting element of FIG. 1 with respect to light of different wavelength bands.

FIG. 3C is a relationship diagram of reflectance of another first light splitting element of FIG. 1 with respect to light of different wavelength bands. As shown in FIG. 1 and FIG. 3C, the illumination system may as well not include the second laser light source 110R. A first light splitting element 131B allows the first laser light 50B to pass through and guides the first laser beam 50B to the wavelength conversion module 120A. When the first wavelength conversion region WR1 is cut into the transmission path of the first laser light 50B, the first laser light 50B is converted into the red wavelength-converted light 60R by the wavelength conversion material thereon. When the second wavelength conversion region WR2 is cut into the transmission path of the first laser light 50B, the first laser light 50B is converted into the green wavelength-converted light 60G by the wavelength conversion material thereon. In addition, when the wavelength-converted light 60R and the wavelength-converted light 60G are transmitted to the first light splitting element 131B, the wavelength-converted light 60R and the wavelength-converted light 60G are reflected by the first light splitting element 131B to respectively form the first sub-color light R and the second sub-color light G, where the first sub-color light R is, for example, red light, and the second sub-color light G is, for example, green light. Moreover, in this embodiment, since the first color light 70B is blue light, the peak wavelength ranges of the first color light 70B, the first sub-color light R, and the second sub-color light G do not overlap each other. The first color light 70B, the first sub-color light R, and the second sub-color light G form the illumination light 70 after passing through the first light splitting element 131B in different time intervals.

Figure 4:
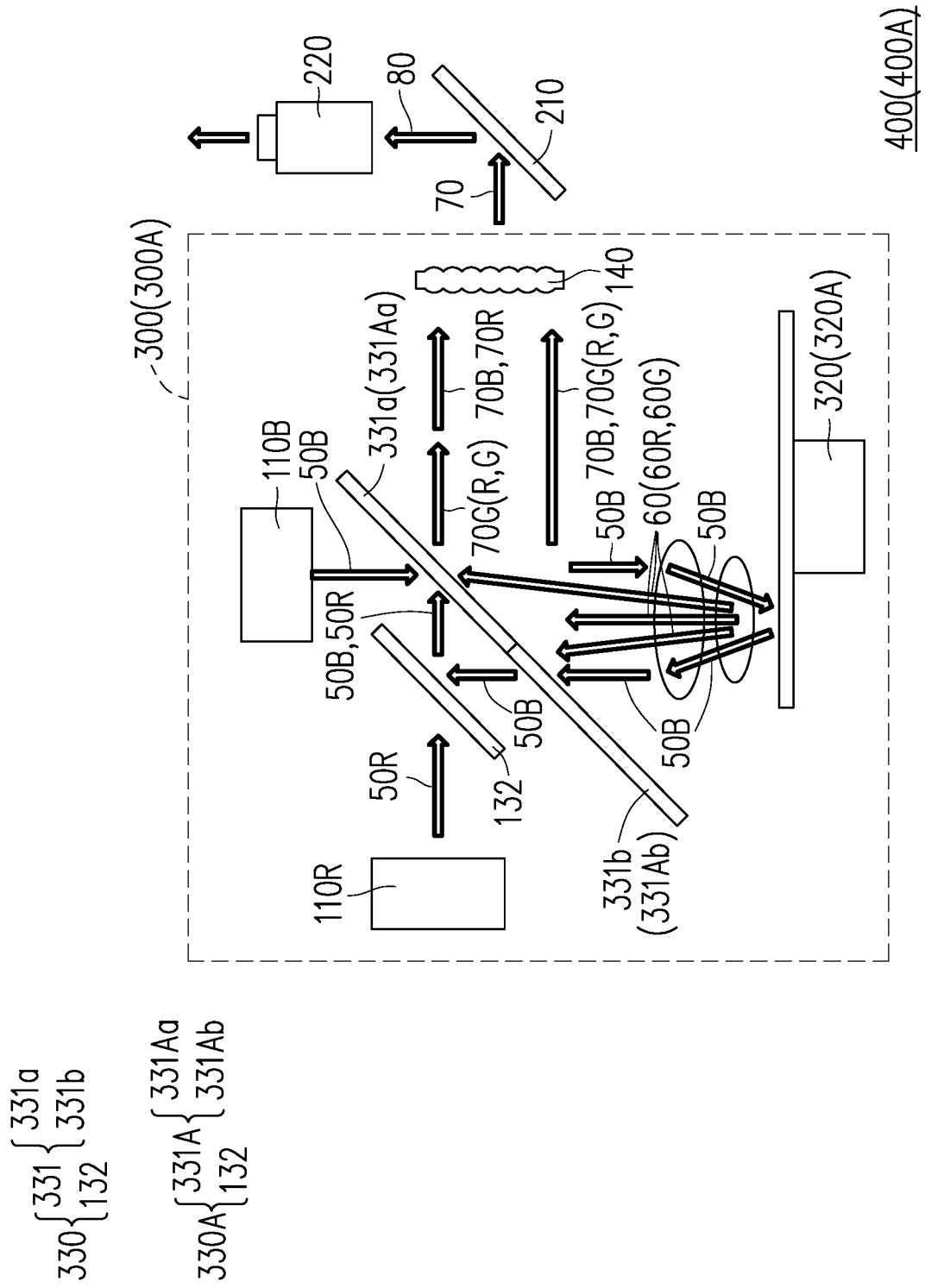
FIG. 4 is a schematic structural diagram of another projection device according to an embodiment of the disclosure.
Figure 5A:
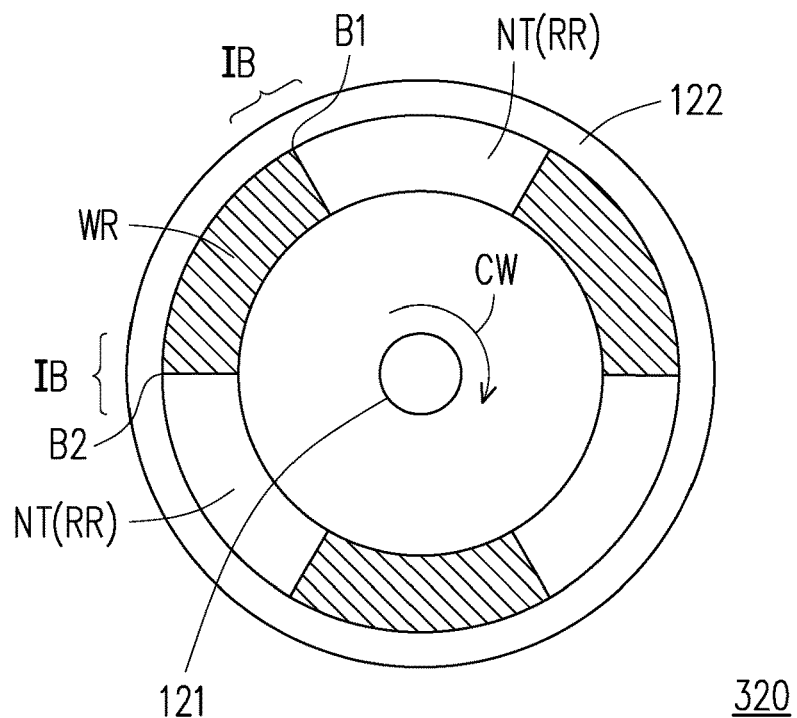
FIG. 5A is a top view of a wavelength conversion module of FIG. 4.
Figure 5B:
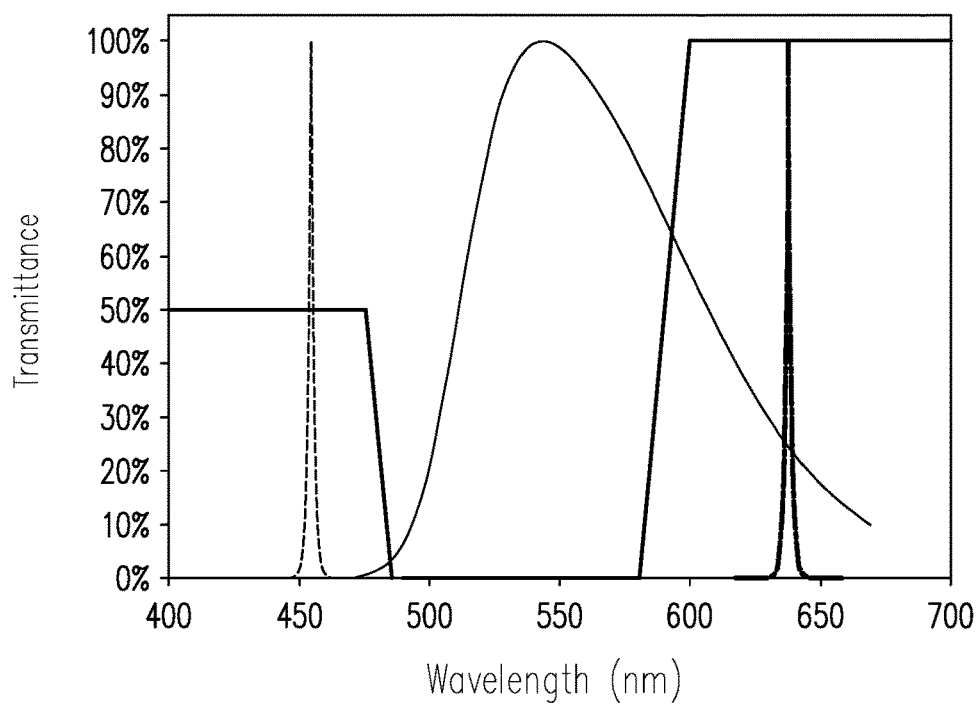
FIG. 5B is a relationship diagram of transmittance of a second light splitting region of a first light splitting element of FIG. 4 with respect to light of different wavelength bands.

FIG. 4 is a schematic structural diagram of another projection device according to an embodiment of the disclosure. FIG. 5A is a top view of a wavelength conversion module of FIG. 4. FIG. 5B is a relationship diagram of transmittance of a second light splitting region of a first light splitting element of FIG. 4 with respect to light of different wavelength bands. An illumination system 300 and a projection device 400 of FIG. 4 are similar to the illumination system 100 and the projection device 200 of FIG. 1, with the following differences. With reference to FIG. 4 and FIG. 5A, the at least one non-conversion region NT of a wavelength conversion module 320 of the illumination system 300 is formed by a reflective layer or a portion of the reflective substrate. That is to say, in this embodiment, the at least one non-conversion region NT is the light reflecting region RR and reflects the first laser light 50B to form the first color light 70B through subsequent optical elements. More specifically, in this embodiment, a first light splitting element 331 of a light splitting and combining module 330 includes a first light splitting region 331a and a second light splitting region 331b. To be specific, in this embodiment, the first light splitting region 331a of the first light splitting element 331 is disposed corresponding to the first laser light source 110B and is located between the first laser light source 110B and the wavelength conversion module 320, the second light splitting region 331b of the first light splitting element 331 is located on the transmission path of the first laser light 50B reflected by the non-conversion region NT of the wavelength conversion module 320, and the second light splitting region 331b is located between the wavelength conversion module 320 and the second light splitting element 132.

Furthermore, in this embodiment, the first light splitting region 331a of the first light splitting element 331 is, for example, a dichroic mirror for reflecting green light. The relationship curve of transmittance of the first light splitting region 331a of the first light splitting element 331 with respect to light of different wavelength bands is the same as the relationship curve transmittance of the first light splitting element 131 with respect to light of different wavelength bands as shown in FIG. 2B, and will not be repeatedly described herein. As such, the first light splitting region 331a of the first light splitting element 331 allows blue light and red light to pass through, and reflects green light. In this way, the first laser light 50B of the first laser light source 110B may still be transmitted to the wavelength conversion module 320 by passing through the first light splitting region 331a of the first light splitting element 331.

On the other hand, in this embodiment, the second light splitting region 331b of the first light splitting element 331 is, for example, a dichroic mirror for reflecting green light and for partially transmitting and partially reflecting blue light. For example, as shown in FIG. 5B, the second splitting region 331b of the first light splitting element 331 reflects light with a wavelength range from 480 nm to 590 nm, has 50% transmittance and 50% reflectance of light with a wavelength range of less than 480 nanometers, and transmits light with a wavelength range of more than 590 nanometers. In this way, as shown in FIG. 5A, when the first laser light 50B is reflected by the non-conversion region NT of the wavelength conversion module 320 to the second light splitting region 331b, a portion of the first laser light 50B is reflected by the second light splitting region 331b of the first light splitting element 331 to one portion of the light homogenizing element 140, and the other portion of the first laser light 50B passes through the second light splitting region 331b of the first light splitting element 331 and is transmitted to the second light splitting element 132, it is reflected by the second light splitting element 132 to the other portion of the light homogenizing element 140, and the first color light 70B is formed after passing through the light homogenizing element 140.

On the other hand, the illumination system 300 may form the second color light 70G and the third color light 70R through respectively disposing the wavelength conversion region WR of the wavelength conversion module 320 and the second laser light source 110R. In this embodiment, a light path of the second color light 70G and the third color light 70R is the same as the light path of the second color light 70G and the third color light 70R in the embodiment of FIG. 1. Reference may be made to the foregoing paragraphs for the relevant details, which will not be repeated described herein.

In this way, by arrangement of the first laser light source 110B, the second laser light source 110R, and the wavelength conversion module 320, the illumination system 300 and the projection device 400 may omit a filter module, so as to reduce loss of brightness and achieve a 100% RGB color light output ratio, and achieve a small size by arranging a microlens array as the light homogenizing element 140, so as to have similar effects and advantages to those of the illumination system 100 and the projection device 200, which will not be repeatedly described herein.

Figure 6A:
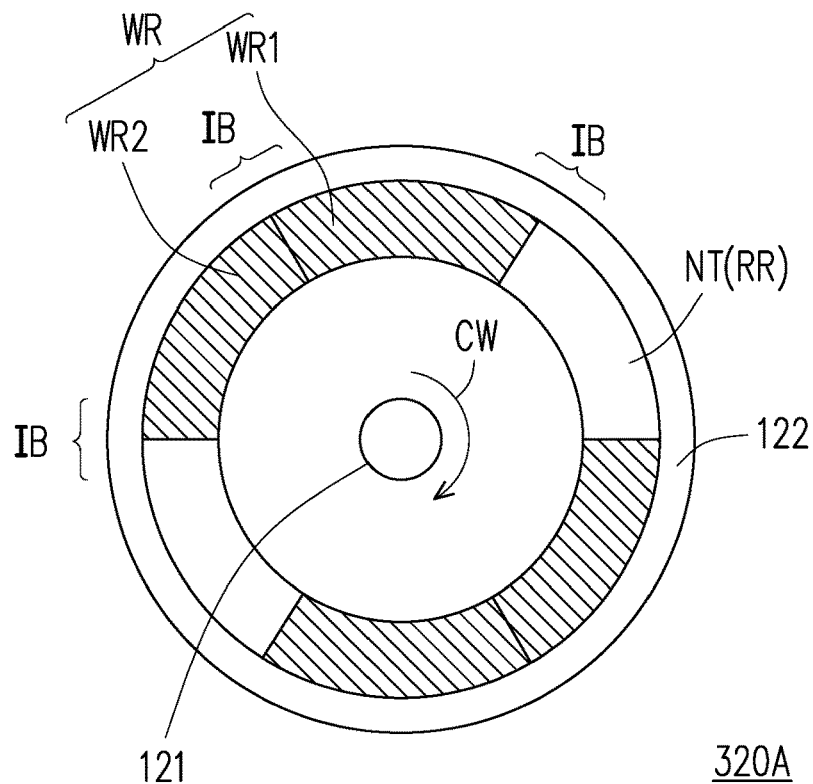
FIG. 6A is a top view of another wavelength conversion module of FIG. 4.
Figure 6B:
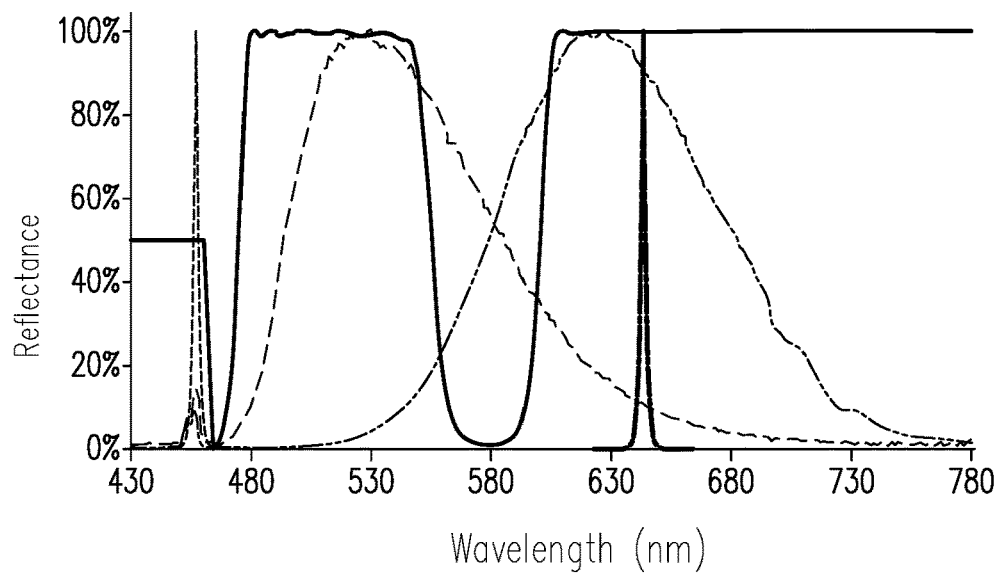
FIG. 6B is a relationship diagram of reflectance of a second light splitting region of another first light splitting element of FIG. 4 with respect to light of different wavelength bands.

FIG. 6A is a top view of another wavelength conversion module of FIG. 4. FIG. 6B is a relationship diagram of reflectance of a second light splitting region of another first light splitting element of FIG. 4 with respect to light of different wavelength bands. A wavelength conversion module 320A of FIG. 6A is similar to the wavelength conversion module 120A of FIG. 3A, with the following differences. As shown in FIG. 6A to FIG. 6B, in this embodiment, the at least one non-conversion region NT of the wavelength conversion module 320A is formed by a reflective layer or a portion of the reflective substrate. That is to say, in this embodiment, the at least one non-conversion region NT is the light reflecting region RR, and reflects the first laser light 50B and form the first color light 70B through subsequent optical elements.

In addition, as shown in FIG. 4, in this embodiment, when the wavelength conversion module 320A is applied to the embodiment of FIG. 4, the structure of an illumination system 300A and a projection device 400A may be formed, and the first light splitting element adopted in the illumination system 300A of FIG. 4 is a first light splitting element 331A. Furthermore, in this embodiment, a first light splitting region 331Aa of the first light splitting element 331A is, for example, a dichroic mirror for reflecting light with a part of red wavelength range and green light. The relationship curve of reflectance of the first light splitting region 331Aa of the first light splitting element 331A with respect to light of different wavelength bands is the same as the relationship curve of reflectance of the first light splitting element 131A as shown in FIG. 3B with respect to light of different wavelength bands, which will not be repeatedly described herein. In this way, the first light splitting region 331Aa of the first light splitting element 331A allows blue light and the second laser light 50R to pass through, and reflects a portion of red converted light and reflects green light. In this way, the first laser light 50B of the first laser light source 110B may be transmitted to the wavelength conversion module 320 by passing through the first light splitting region 331Aa of the first light splitting element 331A. On the other hand, in this embodiment, as shown in FIG. 6B, a second light splitting region 331Ab of the first light splitting element 331A is, for example, a dichroic mirror for reflecting red light, green light, and partially transmitting and partially reflecting blue light.

In this way, as shown in FIG. 4, the illumination system 300A and the projection device 400A may form the first color light 70B, the first sub-color light R, the second sub-color light G, and the third color light 70R by arrangement of the first laser light source 110B, the first light splitting element 331A, the first wavelength conversion region WR1 and the second wavelength conversion region WR2 of the wavelength conversion module 320A, and the second laser light source 110R. Among them, the second laser light 50R emitted by the second laser light source 110R passes through the second light splitting element 132 and the first light splitting region 331Aa of the first light splitting element 331A to form the third color light 70R. In this embodiment, a light path of the first sub-color light R, the second sub-color light G, and the third color light 70R is also the same as the light path of the first sub-color light R, the second sub-color light G, and the third color light 70R of the embodiment of FIG. 1. Reference may be made to the foregoing paragraphs for relevant details, which will not be repeatedly described herein.

In this way, by arrangement of the first laser light source 110B, the second laser light source 110R, and the wavelength conversion module 320A, the illumination system 300A and the projection device 400A may omit a filter module, so as to reduce loss of brightness and achieve a 100% RGB color light output ratio, and achieve a small size by arranging a microlens array as the light homogenizing element 140, so as to have similar effects and advantages to those of the illumination system 300 and the projection device 400, which will not be repeatedly described herein.

Figure 7A:
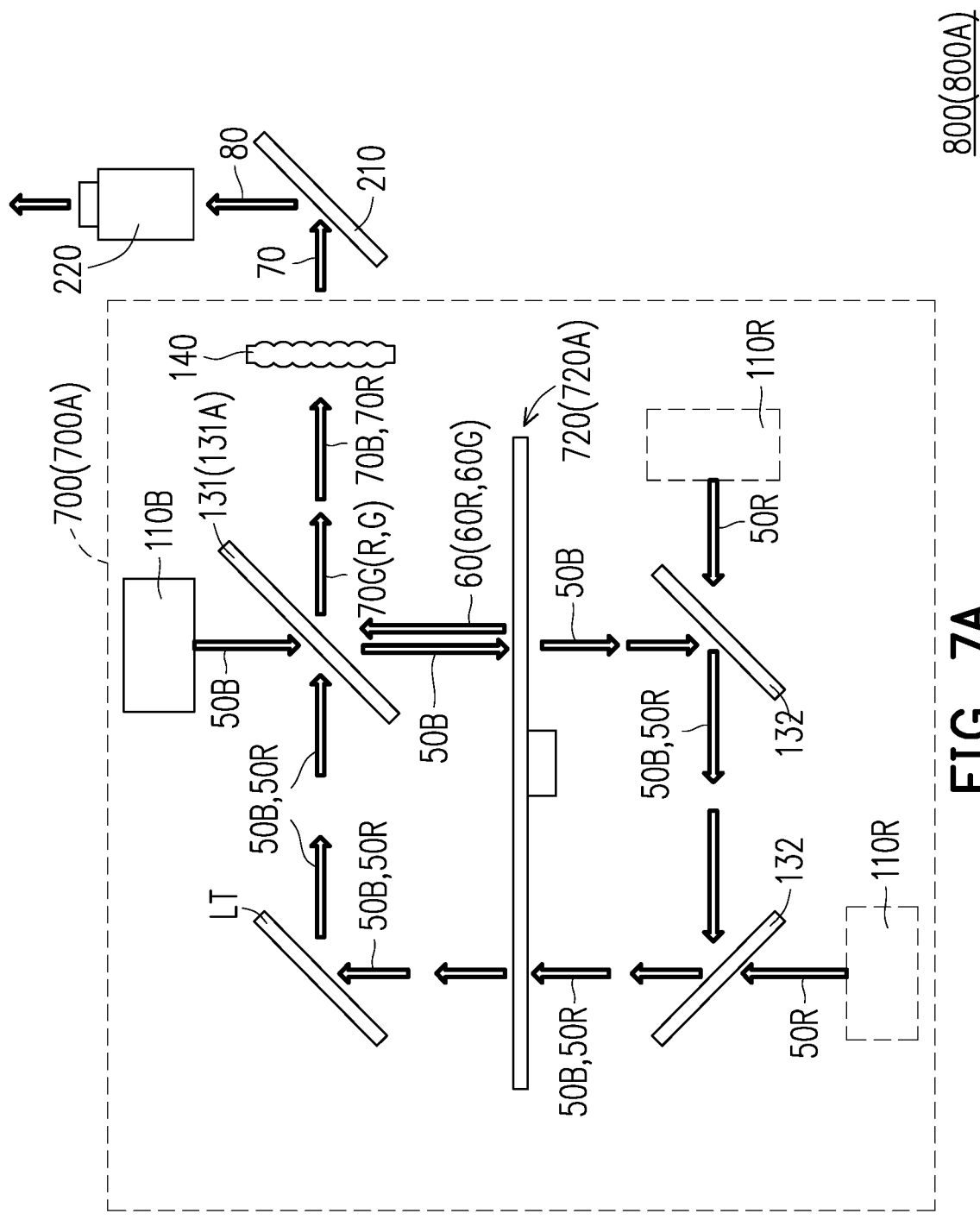
FIG. 7A is a schematic structural diagram of yet another projection device according to an embodiment of the disclosure.
Figure 7B:
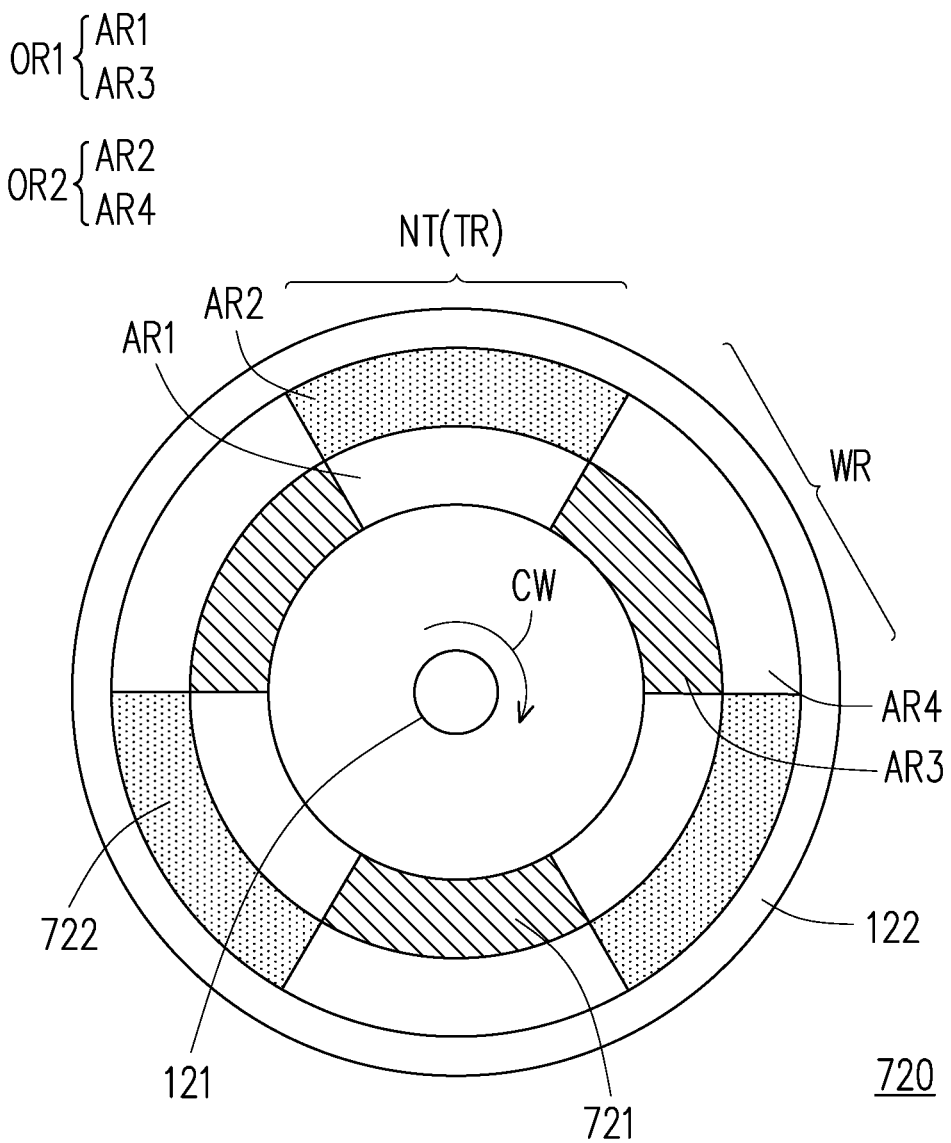
FIG. 7B is a top view of a wavelength conversion module of FIG. 7A.
Figure 7C:
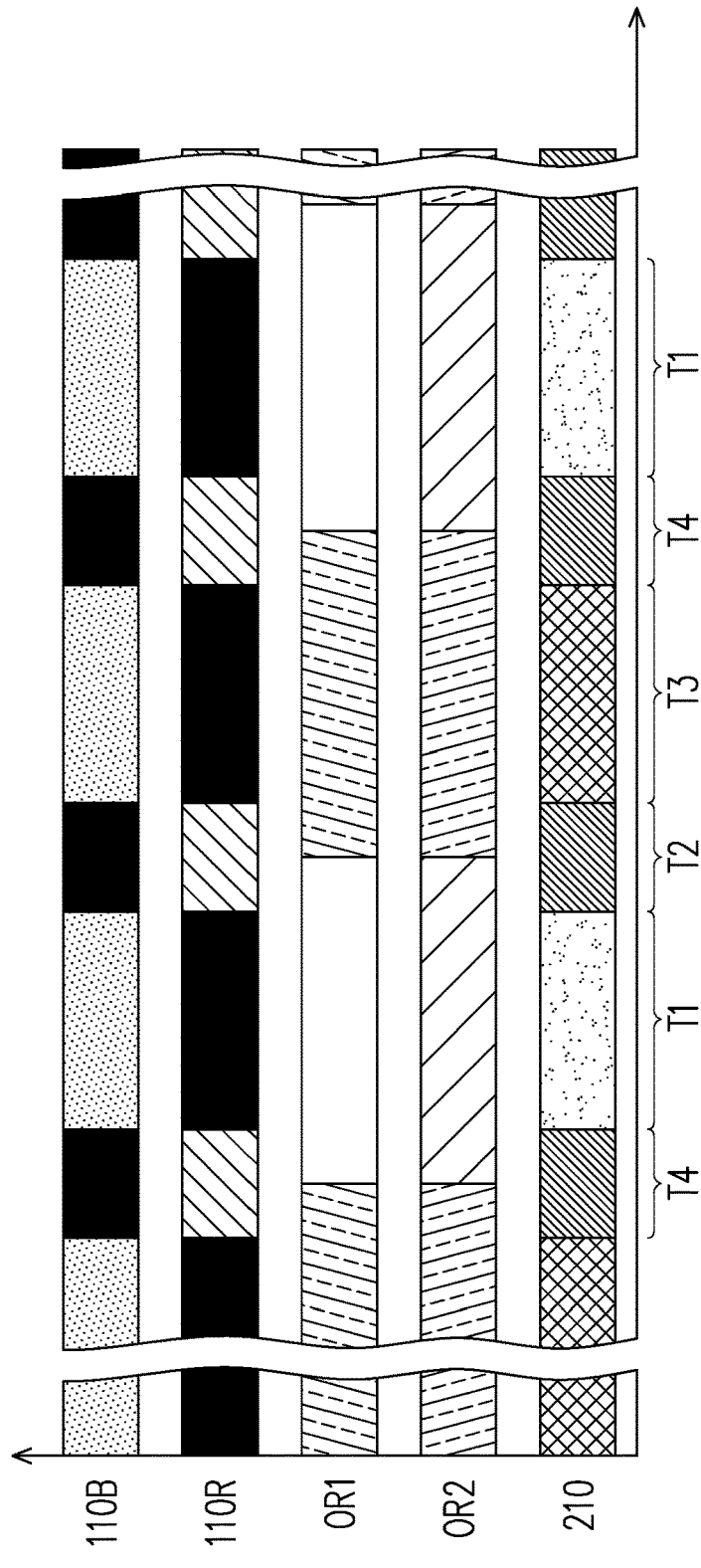
FIG. 7C is a schematic timing diagram of the first laser light source, the second laser light source, a wavelength conversion module, and the light valve of FIG. 7A in different time intervals.

FIG. 7A is a schematic structural diagram of yet another projection device according to an embodiment of the disclosure. FIG. 7B is a top view of a wavelength conversion module of FIG. 7A. FIG. 7C is a schematic timing diagram of the first laser light source, the second laser light source, a wavelength conversion module, and the light valve of FIG. 7A in different time intervals. With reference to FIG. 7A, an illumination system 700 and a projection device 800 of the embodiment of FIG. 7A are similar to the illumination system 100 and the projection device 200 of FIG. 1, with the following differences. As shown in FIG. 7A to FIG. 7B, in this embodiment, a wavelength conversion module 720 of the illumination system 700 includes at least one wavelength conversion layer 721 and at least one diffusing layer 722. The at least one non-conversion region NT includes a first arc region AR1 and a second arc region AR2 disposed in different radial ranges, and the at least one wavelength conversion region WR of the wavelength conversion module 720 includes a third arc region AR3 and a fourth arc region AR4 disposed in different radial ranges. In addition, the at least one diffusing layer 722 is disposed in the second arc region AR2 of the at least one non-conversion region NT, and the at least one wavelength conversion layer 721 is disposed in the third arc region AR3 of the at least one wavelength conversion region WR. Since the at least one second color light 70G does not pass through the fourth arc region AR4, the fourth arc region AR4 where the wavelength conversion layer 721 is not disposed in the at least one wavelength conversion region WR may be an idle region. Besides, in another embodiment not shown, the first arc region AR1 of the at least one non-conversion region NT may be disposed with the diffusing layer 722.

Moreover, the radial range of the first arc region AR1 is equal to the radial range of the third arc region AR3, and the radial range of the second arc region AR2 is equal to the radial range of the fourth arc region AR4. The first arc region AR1 is closer to a center of the wavelength conversion module 720 than the second arc region AR2 in the radial direction, and the third arc region AR3 is closer to the center of the wavelength conversion module 720 than the fourth arc region AR4 in the radial direction. Also, an edge of the first arc region AR1 and an edge of the third arc region AR3 are aligned in a circumferential direction, and an edge of the second arc region AR2 and an edge of the fourth arc region AR4 are aligned in the circumferential direction. In this way, as shown in FIG. 7B, the first arc region AR1 and the third arc region AR3 form a first annular region OR1 of the wavelength conversion module 720, the second arc region AR2 and the fourth arc region AR4 form a second annular region OR2 of the wavelength conversion module 720, and the first annular region OR1 and the second annular region OR2 are concentric annular regions with each other.

Furthermore, as shown in FIG. 7A and FIG. 7C, in the first time interval T1, when passing through the at least one non-conversion region NT of the wavelength conversion module 720, the first laser light 50B forms the first color light 70B after sequentially passing through the first arc region AR1 of the first annular region OR1 and the at least one diffusing layer 722 of the second arc region AR2 of the second annular region OR2. In a third time interval T3, the first laser light source 110B is turned on and the second laser light source 110R is turned off, and after being incident to the at least one wavelength conversion layer 721 of the third arc region AR3, the first laser light 50B may is converted into the wavelength-converted light 60 and the wavelength-converted light 60 is transmitted to the first light splitting element to form the at least one second color light 70G. In addition, as shown in FIG. 7A, the second light splitting element 132 corresponding to the second laser light source 110R may be disposed on a light path between the first annular region OR1 and the second annular region OR2 of the wavelength conversion module 720. In this way, as shown in FIG. 7A and FIG. 7C, the second laser light 50R provided by the second laser light source 110R form the third color light 70R in the second time interval T2 after passing through the second light splitting element 132 and the at least one diffusing layer 722 in the second arc region AR2.

In this way, through the arrangement of the first laser light source 110B, the second laser light source 110R, and the wavelength conversion module 720, the illumination system 700 and the projection device 800 may also omit a filter module, so as to reduce loss of brightness and achieve a 100% RGB color light output ratio, and achieve a small size by arranging a microlens array as the light homogenizing element 140, so as to have similar effects and advantages to those of the illumination system 100 and the projection device 200, which will not be repeatedly described herein.

Figure 7D:
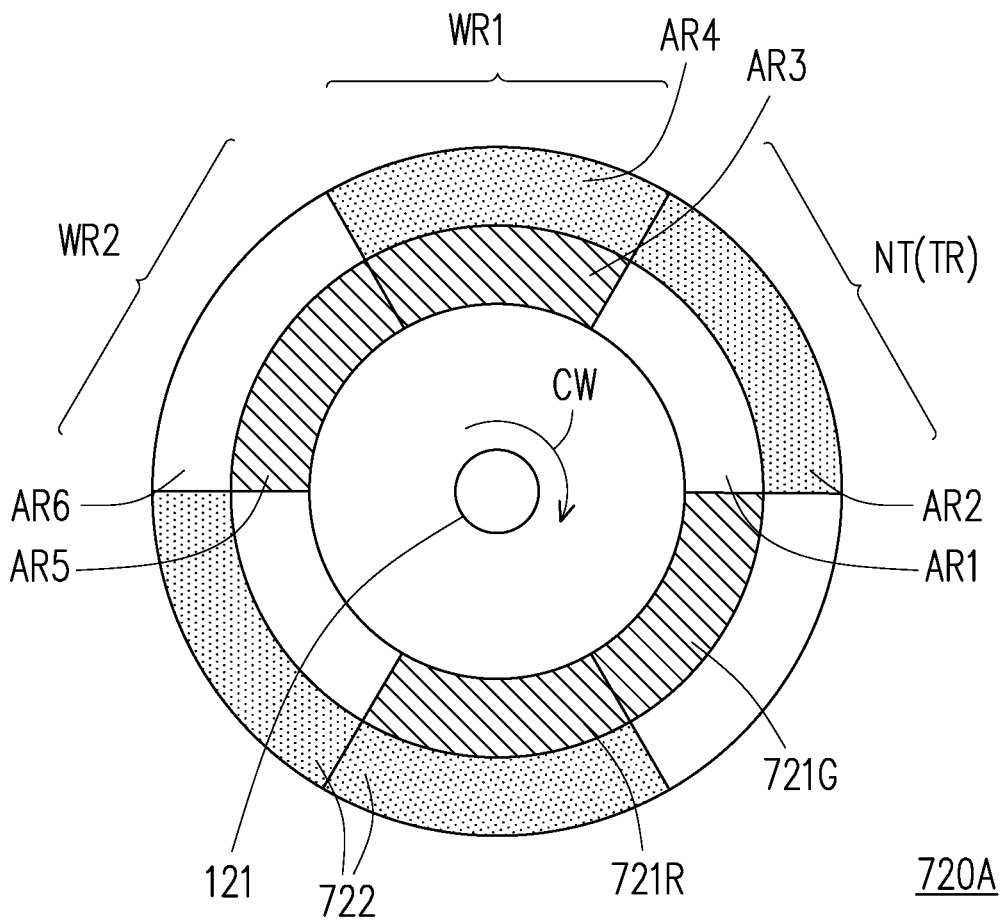
FIG. 7D is a top view of another wavelength conversion module of FIG. 7A.

FIG. 7D is a top view of another wavelength conversion module of FIG. 7A. A wavelength conversion module 720A of FIG. 7D is similar to the wavelength conversion module 720 of FIG. 7B, with the following differences. As shown in FIG. 7D, in this embodiment, the at least one wavelength conversion region WR of the wavelength conversion module 720A includes the first wavelength conversion region WR1 and the second wavelength conversion region WR2. In addition, the at least one non-conversion region NT includes the first arc region AR1 and the second arc region AR2 disposed in different radial ranges, the first wavelength conversion region WR1 includes the third arc region AR3 and the fourth arc region AR4 disposed in different radial ranges, and the second wavelength conversion region WR2 includes a fifth arc region AR5 and a sixth arc region AR6 disposed in different radial ranges.

Furthermore, in this embodiment, the first arc region AR1 is closer to a center of the wavelength conversion module 720A than the second arc region AR2 in the radial direction, the third arc region AR3 is closer to the center of the wavelength conversion module 720A than the fourth arc region AR4 in the radial direction, and the fifth arc region AR5 is closer to the center of the wavelength conversion module 720A than the sixth arc region AR6 in the radial direction. Also, the edge of the first arc region AR1, the edge of the third arc region AR3, and an edge of the fifth arc region AR5 are aligned in a circumferential direction, and the edge of the second arc region AR2, the edge of the fourth arc region AR4, and an edge of the sixth arc region AR6 are aligned in the circumferential direction. In this way, as shown in FIG. 7D, the first arc region AR1, third arc region AR3, and fifth arc region AR5 for the first annular region OR1 of the wavelength conversion module 720A, the second arc region AR2, the fourth arc region AR4, and the sixth arc region AR6 form the second annular region OR2 of the wavelength conversion module 720A, and the first annular region OR1 and the second annular region OR2 are concentric annular regions with each other.

Moreover, the wavelength conversion module 720A also includes a first wavelength conversion layer 721R, a second wavelength conversion layer 721G, and the at least one diffusing layer 722. For example, in this embodiment, the wavelength conversion material of the first wavelength conversion layer 721R located in the first wavelength conversion region WR1 may be phosphor powder which is capable to be excited to produce a red color light, and the wavelength conversion material of the second wavelength conversion layer 721G located in the second wavelength conversion region WR2 may be phosphor powder which is capable to be excited to produce a green color light. Furthermore, the at least one diffusing layer 722 is disposed in the second arc region AR2 of the at least one non-conversion region NT and the fourth arc region AR4 of the first wavelength conversion region WR1. The first wavelength conversion layer 721R is disposed in the third arc region AR3 of the first wavelength conversion region WR1, and the second wavelength conversion layer 721G is disposed in the fifth arc region AR5 of the second wavelength conversion region WR2. Besides, in another embodiment not shown, the first arc region AR1 of the at least one non-conversion region NT may also be disposed with the diffusing layer 722.

In this way, when the wavelength conversion module 720A is applied to the embodiment of FIG. 7A, the structure of an illumination system 700A and a projection device 800A may be formed, and the first light splitting element adopted in the illumination system 700A of FIG. 7A is the first light splitting element 131A. In this way, as shown in FIG. 7A, the illumination system 700A and the projection device 800A may still form the first color light 70B, the first sub-color light R, the second sub-color light G, and the third color light 70R by arrangement of the first laser light source 110B, the first light splitting element 131A, the first wavelength conversion region WR1 and the second wavelength conversion region WR2 of the wavelength conversion module 720A, and the second laser light source 110R.

Furthermore, as shown in FIG. 7A, in the first time interval T1, when passing through the at least one non-conversion region NT of the wavelength conversion module 720A, the first laser light 50B forms the first color light 70B after sequentially passing through the first arc region AR1 and the at least one diffusing layer 722 of the second arc region AR2. In the third time interval T3, the first laser light 50B is converted into the wavelength-converted light 60 by the first wavelength conversion layer 721R of the third arc region AR3 of the first wavelength conversion region WR1 and the wavelength-converted light 60 is reflected by the first light splitting element 131A to form the first sub color light R, and the first laser light 50B is converted into the wavelength-converted light 60 by the second wavelength conversion layer 721G of the fifth arc region AR5 of the second wavelength conversion region WR2 and the wavelength-converted light 60 is reflected by the first light splitting element 131A to form the second sub color light G. In addition, as shown in FIG. 7A, in the second time interval T2, the second laser light 50R forms the third color light 70R after passing through the at least one diffusing layer 722 located in the fourth arc region AR4.

In this way, as shown in FIG. 7A, by the arrangement of the first laser light source 110B, the first light splitting element 131A, the first wavelength conversion region WR1 and the second wavelength conversion region WR2 of the wavelength conversion module 720A, and the second laser light source 110R, the illumination system 700A and the projection device 800A may omit a filter module 1100, so as to reduce loss of brightness and achieve a 100% RGB color light output ratio, and achieve a small size by arranging a microlens array as the light homogenizing element 140, so as to have similar effects and advantages to those of the lighting system 700A and the projection device 800A, which will not be repeatedly described herein.

Figure 8A:
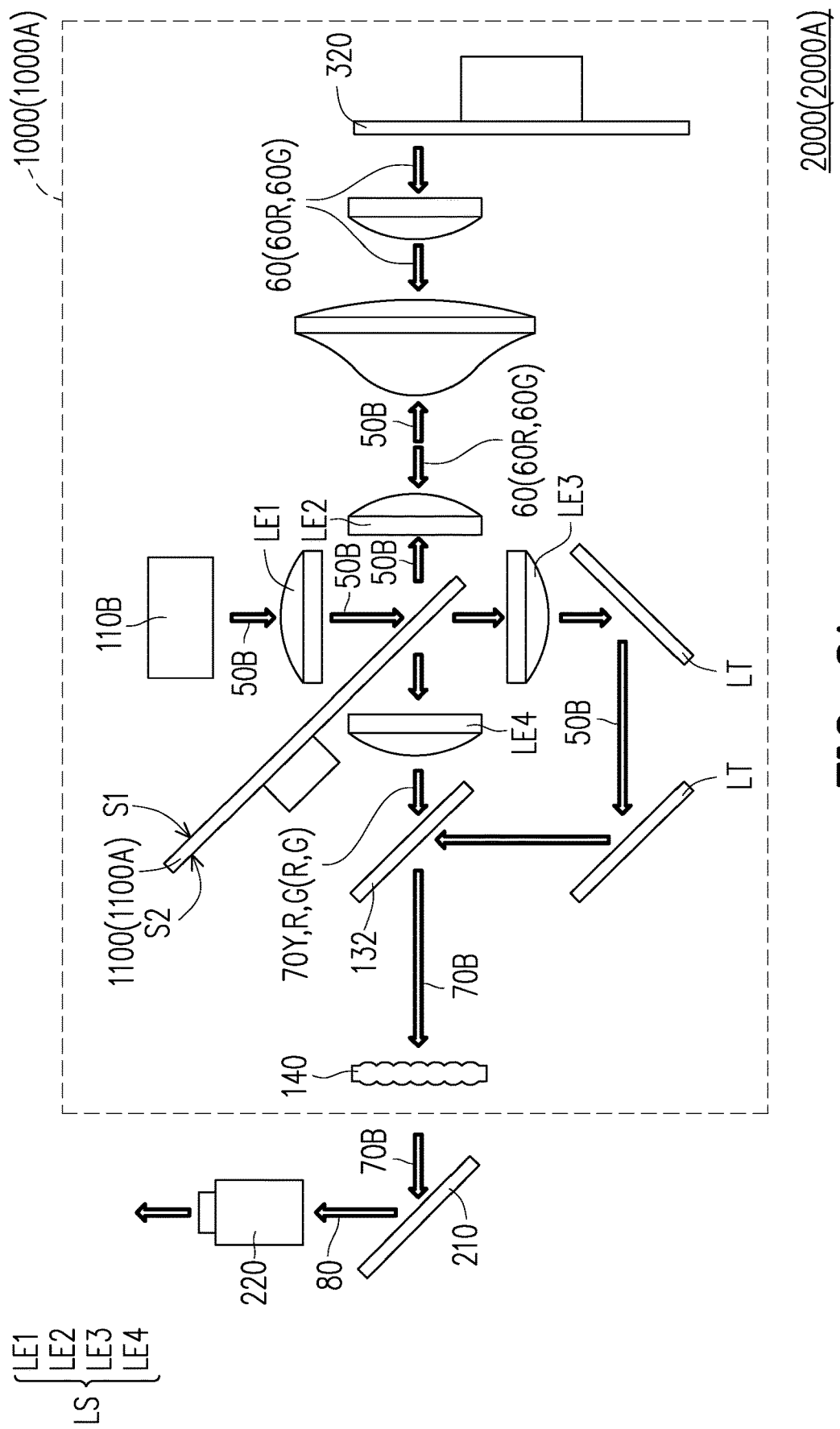
FIG. 8A is a schematic structural diagram of still another projection device according to an embodiment of the disclosure.
Figures 8B, 8C:
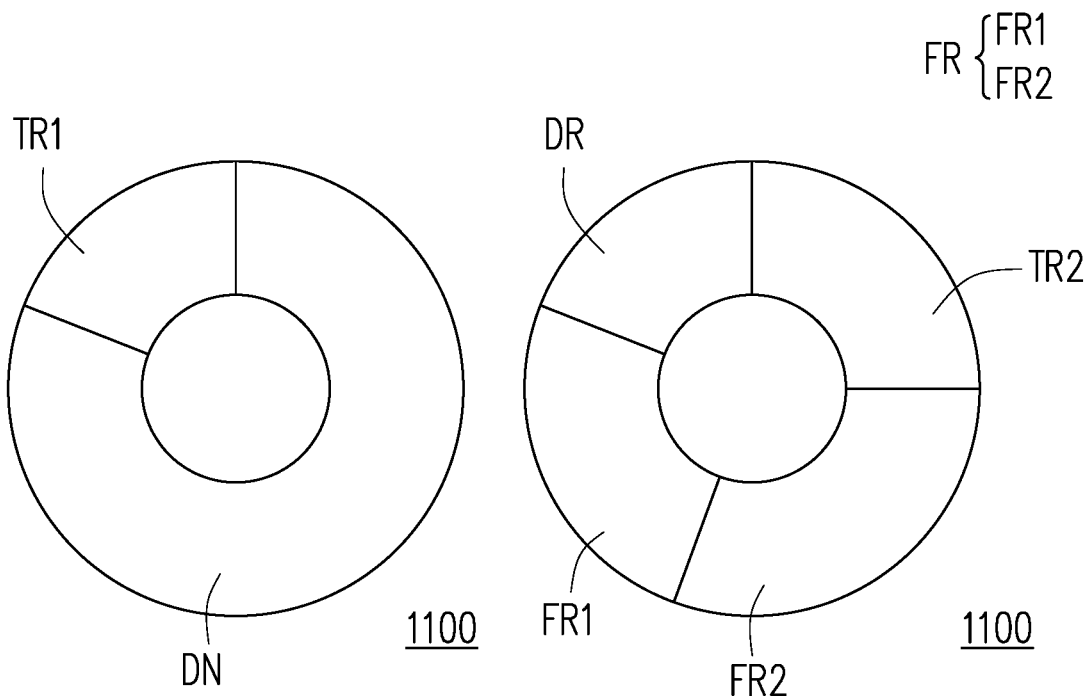
FIG. 8B and FIG. 8C are respectively a top view and a bottom view of a filter module of FIG. 8A.

FIG. 8A is a schematic structural diagram of still another projection device according to an embodiment of the disclosure. FIG. 8B and FIG. 8C are respectively a top view and a bottom view of a filter module 1100 of FIG. 8A. With reference to FIG. 8A, an illumination system 1000 and a projection device 2000 of the embodiment of FIG. 8A are similar to the illumination system 100 and the projection device 200 of FIG. 1, with the following differences. As shown in FIG. 8A to FIG. 8C, in this embodiment, the first light splitting element 131 is replaced with the filter module 1100 in the illumination system 1000.

Furthermore, as shown in FIG. 8A to FIG. 8C, the filter module 1100 includes a first surface S1 and a second surface S2 opposite to each other. The first surface S1 faces the wavelength conversion module 320. Furthermore, in the filter module 1100, a transmissive region TR1 and a splitting region DN are disposed on the first surface S1 as shown in FIG. 8B, a diffusing region DR and a filter optical region FR are disposed on the second surface S2 as shown in FIG. 8C. In addition, as shown in FIG. 8B to FIG. 8C, the diffusing region DR and the transmissive region TR1 are opposite to each other, and the splitting region DN and the filter optical region FR are opposite to each other. Moreover, the at least one non-conversion region NT of the wavelength conversion module 320 corresponds to the diffusing region DR and the transmissive region TR1 of the filter module 1100, the at least one wavelength conversion region WR of the wavelength conversion module 320 corresponds to the splitting region DN and the filter optical region FR of the filter module 1100.

Furthermore, in this embodiment, the splitting region DN of the first surface S1 of the filter module 1100 is, for example, a dichroic mirror for reflecting blue light and transmitting other color light, which will not be repeatedly described herein.

In addition, as shown in FIG. 8A, the filter module 1100 is configured to rotate, such that the transmissive region TR1 and the splitting region DN of the first surface S1 are alternately moved into the transmission path of the first laser light 50B. When the transmissive region TR1 of the first surface S1 is cut into the transmission path of the first laser light 50B, the first laser light 50B sequentially passes through the transmissive region TR1 of the first surface S1 and the diffusing region DR of the second surface S2 of the filter module 1100, and is transmitted by through the at least one light transmitting element LT to the second light splitting element 132 to form the first color light 70B. On the other hand, when the splitting region DN of the first surface S1 is cut into the transmission path of the first laser light 50B, the first laser light 50B is transmitted to the second light splitting element 132 and forms the at least one second color light 70G by the splitting region DN of the first surface S1 of the filter module 1100, the at least one wavelength conversion region WR of the wavelength conversion module 720, and the filter optical region FR of the filter module 1100.

Furthermore, in this embodiment, the filter optical region FR of the filter module 1100 includes a light-transmitting region TR2, a first filter region FR1, and a second filter region FR2. In a time interval, the first laser light 50B forms at least one second color light 70Y after being converted by the at least one wavelength conversion region WR and passing through the light-transmitting region TR2. In another time interval, the first laser light 50B forms the first sub-color light R after being converted by the at least one wavelength conversion region WR and passing through the first filter region FR1. In yet another time interval, the first laser light 50B forms the second sub-color light G after being converted by the at least one wavelength conversion region WR and passing through the second filter region FR2. For example, in this embodiment, the first color light 70B is blue light, the first sub-color light R is red light, the second sub-color light G is green light, and the at least one second color light 70Y is yellow light formed by combining with the first sub-color light R and the second sub-color light G. That is to say, light-emitting wavelength ranges of the first color light 70B, the first sub-color light R, and the second sub-color light G do not overlap each other.

On the other hand, in this embodiment, the illumination system also includes a light pattern adjusting lens group LS, and the light pattern adjusting lens group LS includes a first light pattern adjusting lens LE1, a second light pattern adjusting lens LE2, a third light pattern adjusting lens LE3, and a fourth light pattern adjusting lens LE4. The first light pattern adjusting lens LE1 is located on the transmission path of the first laser light 50B, and between the first laser light source 110B and the filter module 1100. The second light pattern adjusting lens LE2 is located on the transmission path of the first laser light 50B, and between the filter module 1100 and the wavelength conversion module 320. The third light pattern adjusting lens LE3 is located on the transmission path of the first laser light 50B after passing through the filter module 1100, and on a light path between the filter module 1100 and a microlens array serving as the light homogenizing element 140. The fourth light pattern adjusting lens LE4 is located on a transmission path of the at least one second color light 70G, and between the filter module 1100 and the microlens array serving as the light homogenizing element 140.

In this way, as shown in FIG. 8A, after passing through the filter module 1100, the first color light 70B (first laser light) is transmitted through the third light pattern adjusting lens LE3 to the microlens array, and after being guided by the wavelength conversion module 320 and the filter module 1100, the second color light 70Y, the first sub-color light R, and the second sub-color light G are transmitted through the fourth light pattern adjusting lens LE4 to the microlens array.

In this way, the filter module 1100 and the wavelength conversion module 320 of the illumination system may share the light pattern adjusting lens group LS to minimize the size of the wavelength conversion module 320 and a size of the filter module 1100 at the same time. In addition, the microlens array serving as the light homogenizing element 140 is independently disposed on a downstream light path behind the filter module 1100 and the wavelength conversion module 320, and is located on a transmission path of the first color light 70B, the first sub-color light R, the second sub-color light G, and the at least one second color light 70Y to form the illumination light. In this way, the illumination system and the projection device also achieve a small size, so as to facilitate an application of projectors requiring a small size.

Figures 8D, 8E:
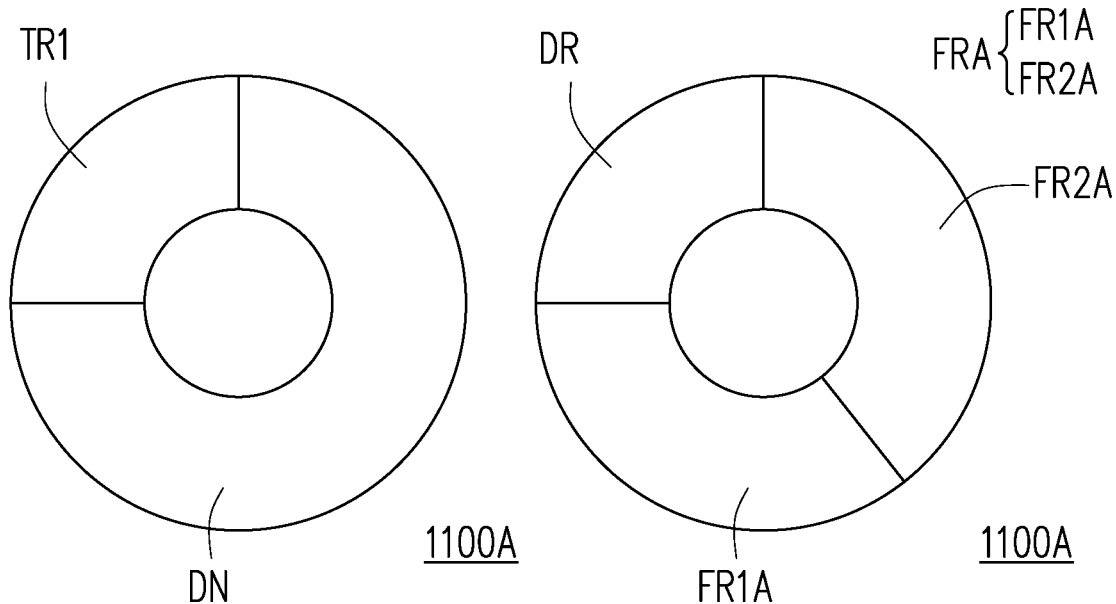
FIG. 8D and FIG. 8E are respectively a top and a bottom view of another filter module of FIG. 8A.

FIG. 8D and FIG. 8E are respectively a top and a bottom view of another filter module of FIG. 8A. A filter module 1100A of FIG. 8D is similar to the filter module 1100 of FIG. 8B, with the following differences. As shown in FIG. 8A/8D, in this embodiment, a filter optical region FRA of the filter module 1100 includes a first filter region FR1A and a second filter region FR2A, and does not include a light-transmitting region TR2.

In addition, as shown in FIG. 8A, in this embodiment, when the filter module 1100A is applied to the embodiment of FIG. 8A, the structure of an illumination system 1000A and a projection device 2000A may be formed, the wavelength conversion module disposed in the illumination system 1000A of FIG. 8A is the wavelength conversion module 120A/320A, and the splitting region on the first surface of the filter module 1100A adopted in the illumination system 1000A of FIG. 8A is, for example, a dichroic mirror for reflecting blue light and transmitting other color light, which will not be repeatedly described herein.

In this way, as shown in FIG. 8A, the first laser light 50B forms the first sub-color light R after being converted by the first wavelength conversion region WR1 of the wavelength conversion module 120A and passing through the first filter region FR1A of the filter module 1100A, and the first laser light 50B forms the second sub-color light G after being converted by the second wavelength conversion region WR2 of the wavelength conversion module 120A and passing through the second filter region FR2A of the filter module 1100A. In this way, the illumination system 1000A and the projection device 2000A may form the first color light 70B, the first sub-color light R, and the second sub-color light G by the arrangement of the first laser light source 110B, the filter module 1100A, and the first wavelength conversion region WR1 and second wavelength conversion region WR2 of the wavelength conversion module 120A.

In this way, the illumination system 1000A and the projection device 2000A may also dispose the light pattern adjusting lens group LS to minimize the size of the wavelength conversion module 120A and a size of the filter module 1100A at the same time, and achieve a small size, so as to have similar effects and advantages to those of the illumination system 1000 and the projection device 2000, which will not be repeatedly described herein.

In summary of the foregoing, the embodiments of the disclosure has at least one of the following advantages or effects. In the embodiments of the disclosure, the projection device and the illumination system may omit a filter module, and achieve a small size by arranging a microlens array as the light homogenizing element, so as to facilitate an application of projectors requiring a small size. On the other hand, in another embodiment of the disclosure, the corresponding splitting region and filter optical region are disposed on the two surfaces of the filter module in the projection device and the illumination system, such that the filter module may be disposed in the top portion of light path of the wavelength conversion module of the projection device and the illumination system. In this way, the filter module and the wavelength conversion module and the light pattern adjusting lens group can cooperate to minimize the sizes of the wavelength conversion module and the filter module at the same time. In addition, a small size is achieved since the microlens array serving as the light uniforming element is independently disposed in the bottom portion of light path of the filter module and the wavelength conversion module, so as to facilitate an application of projectors requiring a small size.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, configured to provide an illumination light and comprising a first laser light source, a second laser light source, a wavelength conversion module, a first light splitting element, and a microlens array, wherein the first laser light source is configured to provide a first laser light in a first time interval;

the second laser light source is configured to provide a second laser light in a second time interval, wherein the first laser light source is turned on in the first time interval and turned off in the second time interval, the second laser light source is turned off in the first time interval and turned on in the second time interval, the wavelength conversion module is located on a transmission path of the first laser light, wherein the wavelength conversion module comprises at least one wavelength conversion region and at least one non-conversion region, and the wavelength conversion module is configured to rotate, such that the at least one wavelength conversion region and the at least one non-conversion region are alternately cut into the transmission path of the first laser light;

the first light splitting element is located on the transmission path of the first laser light and a transmission path of the second laser light, wherein when the first laser light is incident to the at least one non-conversion region of the wavelength conversion module, the first laser light forms a first color light by the first light splitting element and the at least one non-conversion region of the wavelength conversion module, and when the first laser light is incident to the at least one wavelength conversion region of the wavelength conversion module, the first laser light forms at least one second color light by the first light splitting element and the wavelength conversion module, the second laser light forms a third color light after passing through the first light splitting element in the second time interval; and the microlens array is located on transmission paths of the first color light, the at least one second color light and the third color light, and the microlens array is configured to homogenize the first color light, the at least one second color light and the third color light, wherein the first color light, the at least one second color light and the third color light form the illumination light in different time intervals after passing through the microlens array, wherein peak wavelength ranges of the first color light, the at least one second color light, and the third color light do not overlap each other.

2. The illumination system according to claim 1, wherein in the wavelength conversion module, a standby region is defined between the at least one wavelength conversion region and the at least one non-conversion region, wherein in the first time interval, the first laser light is incident to the at least one non-conversion region or the at least one wavelength conversion region of the wavelength conversion module, and in the second time interval, the standby region is cut into the transmission path of the first laser light formed in the first time interval.

3. The illumination system according to claim 1, wherein the at least one non-conversion region is a light transmissive region.

4. The illumination system according to claim 3, wherein the wavelength conversion module comprises at least one wavelength conversion layer and at least one diffusing layer, the at least one non-conversion region comprises a first arc region and a second arc region disposed in different radial ranges, the at least one wavelength conversion region of the wavelength conversion module comprises a third arc region and a fourth arc region disposed in different radial ranges, the at least one diffusing layer is disposed in the second arc region of the at least one non-conversion region, the at least one wavelength conversion layer is disposed in the third arc region of the at least one wavelength conversion region, the first laser light forms the first color light after passing through the at least one diffusing layer, and the first laser light forms the at least one second color light by the at least one wavelength conversion layer.

5. The illumination system according to claim 4, wherein the second laser light forms the third color light after passing through the at least one diffusing layer located in the second arc region in the second time interval.

6. The illumination system according to claim 4, wherein the first arc region is closer to a center of the wavelength conversion module than the second arc region, the third arc region is closer to the center of the wavelength conversion module than the fourth arc region, an edge of the first arc region is aligned with an edge of the third arc region in a circumferential direction, and an edge of the second arc region and an edge of the fourth arc region are aligned in the circumferential direction.

7. The illumination system according to claim 1, wherein the at least one non-conversion region is a light reflecting region.

8. A projection device, comprising:
the illumination system according to claim 1;
a light valve located on a transmission path of the illumination light and configured to convert the illumination light into an image light; and
a projection lens located on a transmission path of the image light and configured to project the image light out of the projection device.

9. An illumination system, configured to provide an illumination light and comprising a first laser light source, a wavelength conversion module, a first light splitting element, and a microlens array, wherein
the first laser light source is configured to provide a first laser light;
the wavelength conversion module is located on a transmission path of the first laser light, wherein the wavelength conversion module comprises at least one wavelength conversion region and at least one non-conversion region, and the wavelength conversion module is configured to rotate, such that the at least one wavelength conversion region and the at least one non-conversion region are alternately cut into the transmission path of the first laser light;
the first light splitting element is located on the transmission path of the first laser light, wherein when the first laser light is incident to the at least one non-conversion region of the wavelength conversion module, the first laser light forms a first color light by the first light splitting element and the at least one non-conversion region of the wavelength conversion module, and when the first laser light is incident to the at least one wavelength conversion region of the wavelength conversion module, the first laser light forms at least one second color light by the first light splitting element and the wavelength conversion module; and
the microlens array is located on transmission paths of the first color light and the at least one second color light, and the microlens array is configured to homogenize the first color light and the at least one second color light,
wherein the at least one wavelength conversion region comprises a first wavelength conversion region and a second wavelength conversion region, and the at least one second color light comprises a first sub-color light and a second sub-color light, wherein when the first laser light is incident to the first wavelength conversion region of the wavelength conversion module, the first laser light forms the first sub-color light by the first light splitting element and the wavelength conversion module, when the first laser light is incident to the second wavelength conversion region of the wavelength conversion module, the first laser light forms the second sub-color light by the first light splitting element and the wavelength conversion module, and peak wavelength ranges of the first color light, the first sub-color light, and the second sub-color light do not overlap each other.

10. The illumination system according to claim 9, wherein the first laser light source provides the first laser light in a first time interval, and the illumination system further comprises a second laser light source configured to provide a second laser light in a second time interval, wherein the first laser light source is turned on in the first time interval and turned off in the second time interval, the second laser light source is turned off in the first time interval and turned on in the second time interval, the first light splitting element is also located on a transmission path of the second laser light, the second laser light forms a third color light after passing through the first light splitting element, the microlens array is also located on a transmission path of the third color light, wherein the first color light, the at least one second color light, and the third color light form the illumination light in different time intervals after passing through the microlens array, and a wavelength range of the third color light overlaps a wavelength range of the first sub-color light.

11. The illumination system according to claim 9, wherein the at least one non-conversion region is a light transmissive region.

12. The illumination system according to claim 11, wherein the wavelength conversion module comprises a first wavelength conversion layer, a second wavelength conversion layer, and at least one diffusing layer, the at least one non-conversion region comprises a first arc region and a second arc region disposed in different radial ranges, the first wavelength conversion region comprises a third arc region and a fourth arc region disposed in different radial ranges, the second wavelength conversion region comprises a fifth arc region and a sixth arc region disposed in different radial ranges, the at least one diffusing layer is disposed in the second arc region of the at least one non-conversion region, the first wavelength conversion layer is disposed in the third arc region of the first wavelength conversion region, the second wavelength conversion layer is disposed in the fifth arc region of the second wavelength conversion region, the first laser light forms the first color light after passing through the at least one diffusing layer of the second arc region, the first laser light forms the first sub-color light by the first wavelength conversion layer, and the first laser light forms the second sub-color light by the second wavelength conversion layer.

13. The illumination system according to claim 12, wherein the first laser light source provides the first laser light in a first time interval, and the illumination system further comprises a second laser light source configured to provide a second laser light in a second time interval, wherein the first laser light source is turned on in the first time interval and turned off in the second time interval, the second laser light source is turned off in the first time interval and turned on in the second time interval, the first light splitting element is also located on a transmission path of the second laser light, the second laser light forms a third color light after passing through the first light splitting element, the microlens array is also located on a transmission path of the third color light, wherein the first color light, the at least one second color light, and the third color light form the illumination light in different time intervals after passing through the microlens array, and a wavelength range of the third color light overlaps a wavelength range of the first sub-color light, and
the at least one diffusing layer is also located in the fourth arc region of the first wavelength conversion region, the second laser light forms the third color light after passing through the at least one diffusing layer located in the fourth arc region in the second time interval.

14. The illumination system according to claim 12, wherein the first arc region is closer to a center of the wavelength conversion module than the second arc region, the third arc region is closer to the center of the wavelength conversion module than the fourth arc region, the fifth arc region is closer to the center of the wavelength conversion module than the sixth arc region, an edge of the first arc region, an edge of the third arc region, and an edge of the fifth arc region are aligned in a circumferential direction, and an edge of the second arc region, an edge of the fourth arc region, and an edge of the sixth arc region are aligned in the circumferential direction.

15. An illumination system, configured to provide an illumination light and comprising a first laser light source, a wavelength conversion module, a filter module, and a microlens array; wherein
the first laser light source is configured to provide a first laser light;
the wavelength conversion module is located on a transmission path of the first laser light, wherein the wavelength conversion module comprises at least one wavelength conversion region, and the wavelength conversion module is configured to rotate, such that the at least one wavelength conversion region is cut into the transmission path of the first laser light;
the filter module is located on the transmission path of the first laser light, wherein the filter module has a first surface and a second surface opposite to each other, where the first surface faces the wavelength conversion module, the filter module is disposed with a transmissive region and a splitting region on the first surface, and a diffusing region and a filter optical region on the second surface, where the diffusing region and the transmissive region are opposite to each other, and the splitting region and the filter optical region are opposite to each other, and the filter module is configured to rotate, such that the transmissive region and the splitting region are cut into the transmission path of the first laser light in turn, wherein when the transmissive region is cut into the transmission path of the first laser light, the first laser light forms a first color light after passing through the transmissive region and the diffusing region of the filter module, and when the splitting region is cut into the transmission path of the first laser light, the first laser light forms at least one second color light by the splitting region of the filter module, the at least one wavelength conversion region of the wavelength conversion module, and the filter optical region of the filter module; and
the microlens array is located on transmission paths of the first color light and the at least one second color light, and is configured to homogenize the first color light and the at least one second color light, wherein the first color light and the at least one second color light form the illumination light in different time intervals after passing through the microlens array.

16. The illumination system according to claim 15, further comprising a light pattern adjusting lens group, wherein the light pattern adjusting lens group comprises a first light pattern adjusting lens, a second light pattern adjusting lens, a third light pattern adjusting lens, and a fourth light pattern adjusting lens, wherein
the first light pattern adjusting lens is located on the transmission path of the first laser light and located between the first laser light source and the filter module;
the second light pattern adjusting lens is located on the transmission path of the first laser light and located between the filter module and the wavelength conversion module;

the third light pattern adjusting lens is located on the transmission path of the first color light and located between the filter module and the microlens array, wherein the first color light is transmitted to the microlens array after passing through the third light pattern adjusting lens; and the fourth light pattern adjusting lens is located on a transmission path of the at least one second color light and located between the filter module and the microlens array, wherein the second color light is transmitted to the microlens array after passing through the fourth light pattern adjusting lens.

17. The illumination system according to claim 15, wherein the filter optical region comprises a light-transmitting region, a first filter region, and a second filter region, the first laser light forms the at least one second color light after be sequentially transmitted to the at least one wavelength conversion region and the light-transmitting region, the first laser light forms a first sub-color light after being sequentially transmitted to the at least one wavelength conversion region and the first filter region, and the first laser light forms a second sub-color light after being sequentially transmitted to the at least one wavelength conversion region and the second filter region.

18. The illumination system according to claim 15, wherein the at least one second color light comprises a first sub-color light and a second sub-color light, the at least one wavelength conversion region comprises a first wavelength conversion region and a second wavelength conversion region, the filter optical region comprises a first filter region and a second filter region, the first laser light forms the first sub-color light after being sequentially transmitted to the first wavelength conversion region and the first filter region, and the first laser light forms the second sub-color light after being sequentially transmitted to the second wavelength conversion region and the second filter region.

19. A projection device, comprising:

the illumination system according to claim 15;

a light valve located on a transmission path of the illumination light and configured to convert the illumination light into an image light; and a projection lens located on a transmission path of the image light and configured to project the image light out of the projection device.

* * * * *